United States Patent [19]
Crimmins et al.

[11] Patent Number: 5,969,842
[45] Date of Patent: Oct. 19, 1999

[54] METHOD AND APPARATUS FOR CORDLESS INFRARED COMMUNICATION

[75] Inventors: James W. Crimmins, Ridgefield; James L. Saulnier, Brookfield, both of Conn.; Steven Gallo, Brewster, N.Y.

[73] Assignee: Wireless Communications Products LLC, Danbury, Conn.

[21] Appl. No.: 09/025,062

[22] Filed: Feb. 17, 1998

Related U.S. Application Data

[62] Division of application No. 08/624,852, Mar. 22, 1996, Pat. No. 5,867,292.

[51] Int. Cl.⁶ .................................................. H04B 10/00
[52] U.S. Cl. ............................................ 359/172; 359/155
[58] Field of Search ..................................... 359/172, 152, 359/154, 173, 110, 125, 159, 142, 158, 155; 340/825.72; 455/503, 67.6

[56] References Cited

U.S. PATENT DOCUMENTS

| | | | |
|---|---|---|---|
| 4,456,793 | 6/1984 | Baker et al. | 179/99 |
| 4,553,267 | 11/1985 | Crimmins | 455/606 |
| 4,727,600 | 2/1988 | Avakian | 455/601 |
| 4,757,553 | 7/1988 | Crimmins | 455/607 |
| 4,975,926 | 12/1990 | Knapp | 375/1 |
| 4,977,619 | 12/1990 | Crimmins | 455/607 |
| 5,103,108 | 4/1992 | Crimmins | 250/338 |
| 5,142,396 | 8/1992 | Divjak | 359/142 |
| 5,201,061 | 4/1993 | Goldberg | 455/51.2 |
| 5,214,526 | 5/1993 | Tonomura | 329/184 |
| 5,247,380 | 9/1993 | Lee et al. | 359/118 |

(List continued on next page.)

FOREIGN PATENT DOCUMENTS 2265521  9/1993  United Kingdom .

OTHER PUBLICATIONS

Article by Dr. Walter H.W. Tuttlebee entitled "Cordless Personal Communications" published in IEEE Communications Magazine of Dec., 1992.

Article by Roger Woolnough entitled "DECT out for digital Wireless" published in OEM Magazine of Feb. 1994.

*Primary Examiner*—Rafael Bacares
*Attorney, Agent, or Firm*—St. Onge Steward Johnston & Reens LLC

[57] ABSTRACT

An infrared (IR) communication system is described in which a base unit for a cell can communicate with a plurality of infrared portable devices through distributed infrared receiver/transmitter (RT) modules over a plurality of channels using IR carrier signals. A call or signal processor, referred to as a radio exchange unit, and controlling communication of a cell, communicates with the base unit to place or receive calls with the IR portable devices. The communication occurs in standard communication frames divided into transmission and receiving segments with each segment further divided into slots and with the slots containing digital data, with each communication-channel formed by a slot. Each transmission segment to an RT module is immediately followed by a responsive receiving segment. As an IR portable device moves from the vicinity of one RT module to another, the base unit automatically and seamlessly and in a robust manner hands over control to the nearer RT module by monitoring signal strength signals from various RT modules coupled to the base unit. When an IR portable device moves from one cell to another, the call processor hands over control to another base unit using standard protocols. Since an IR portable device may receive IR communication signals from several RT modules, care is taken to avoid signal interference by effectively controlling signal propagation lengths between the base unit and RT modules so that signals arriving from nearby RT modules at a common IR portable device do not have a phase difference more than a predetermined amount. The path lengths can be controlled by selecting cable lengths or by insertion of delays between the base unit and the RT modules to assure that IR signals arrive at portable devices with a minimum amount of interference.

11 Claims, 16 Drawing Sheets

U.S. PATENT DOCUMENTS

| | | | |
|---|---|---|---|
| 5,258,981 | 11/1993 | Davey et al. | 370/95.1 |
| 5,319,191 | 6/1994 | Crimmins | 250/214 |
| 5,351,149 | 9/1994 | Crimmins | 359/181 |
| 5,361,398 | 11/1994 | Christian et al. | 455/51.2 |
| 5,371,623 | 12/1994 | Eastmond et al. | 359/167 |
| 5,383,043 | 1/1995 | Su | 359/142 |
| 5,394,410 | 2/1995 | Chen | 371/70 |
| 5,416,778 | 5/1995 | Chan et al. | 370/95.1 |
| 5,440,559 | 8/1995 | Gaskill | 370/95.1 |
| 5,440,613 | 8/1995 | Fuentes | 379/60 |
| 5,459,727 | 10/1995 | Vannucci | 370/85.2 |
| 5,463,617 | 10/1995 | Grube et al. | 370/29 |
| 5,463,623 | 10/1995 | Grimes et al. | 370/79 |
| 5,463,673 | 10/1995 | Hersovici | 379/59 |
| 5,475,381 | 12/1995 | Williamson et al. | 340/825 |
| 5,475,677 | 12/1995 | Arnold et al. | 370/29 |
| 5,475,681 | 12/1995 | White et al. | 370/60 |
| 5,479,408 | 12/1995 | Will | 370/94.1 |
| 5,519,759 | 5/1996 | Heineck et al. | 379/59 |
| 5,548,806 | 8/1996 | Yamaguchi et al. | 455/33.1 |
| 5,566,022 | 10/1996 | Segev | 359/172 |

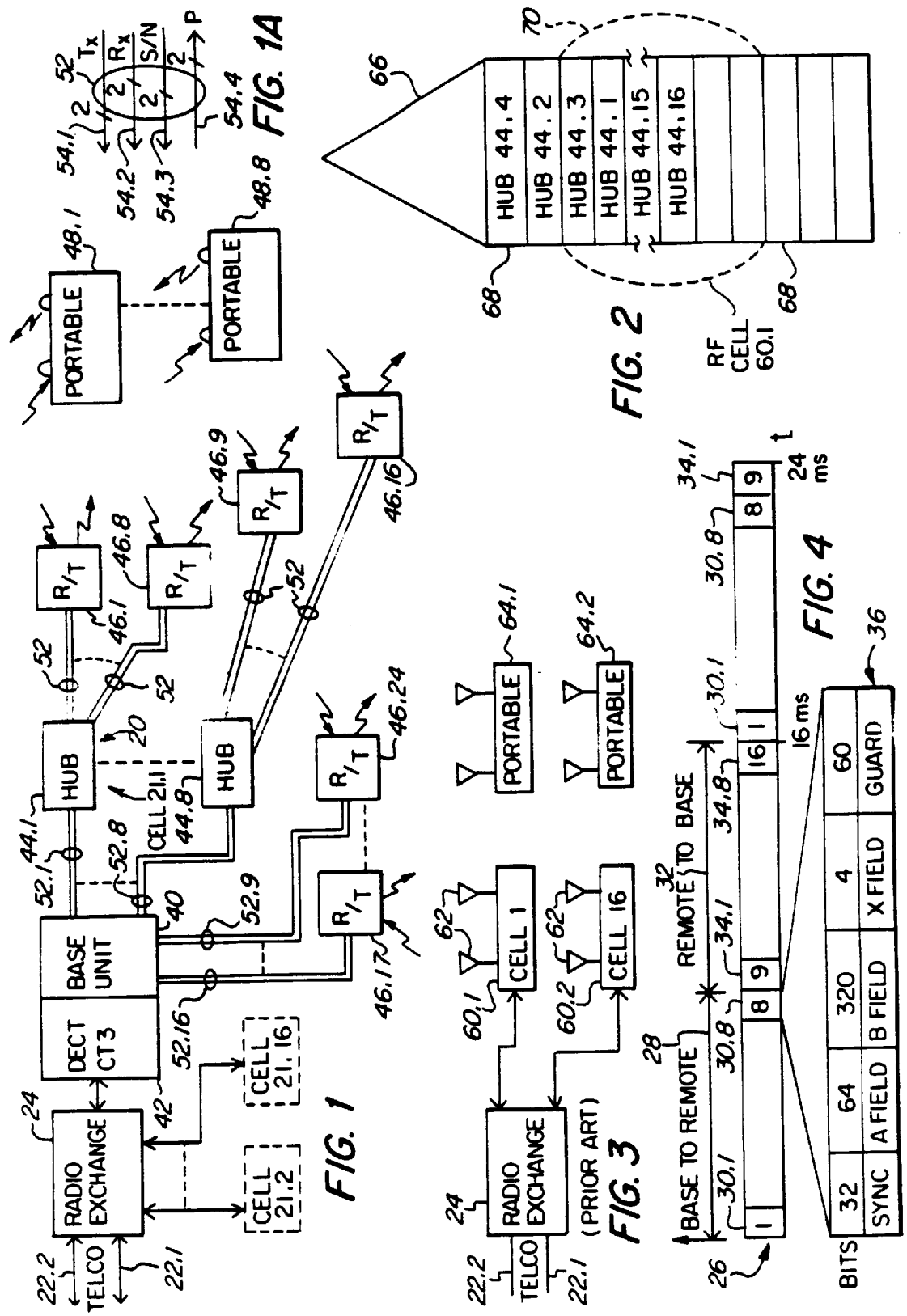

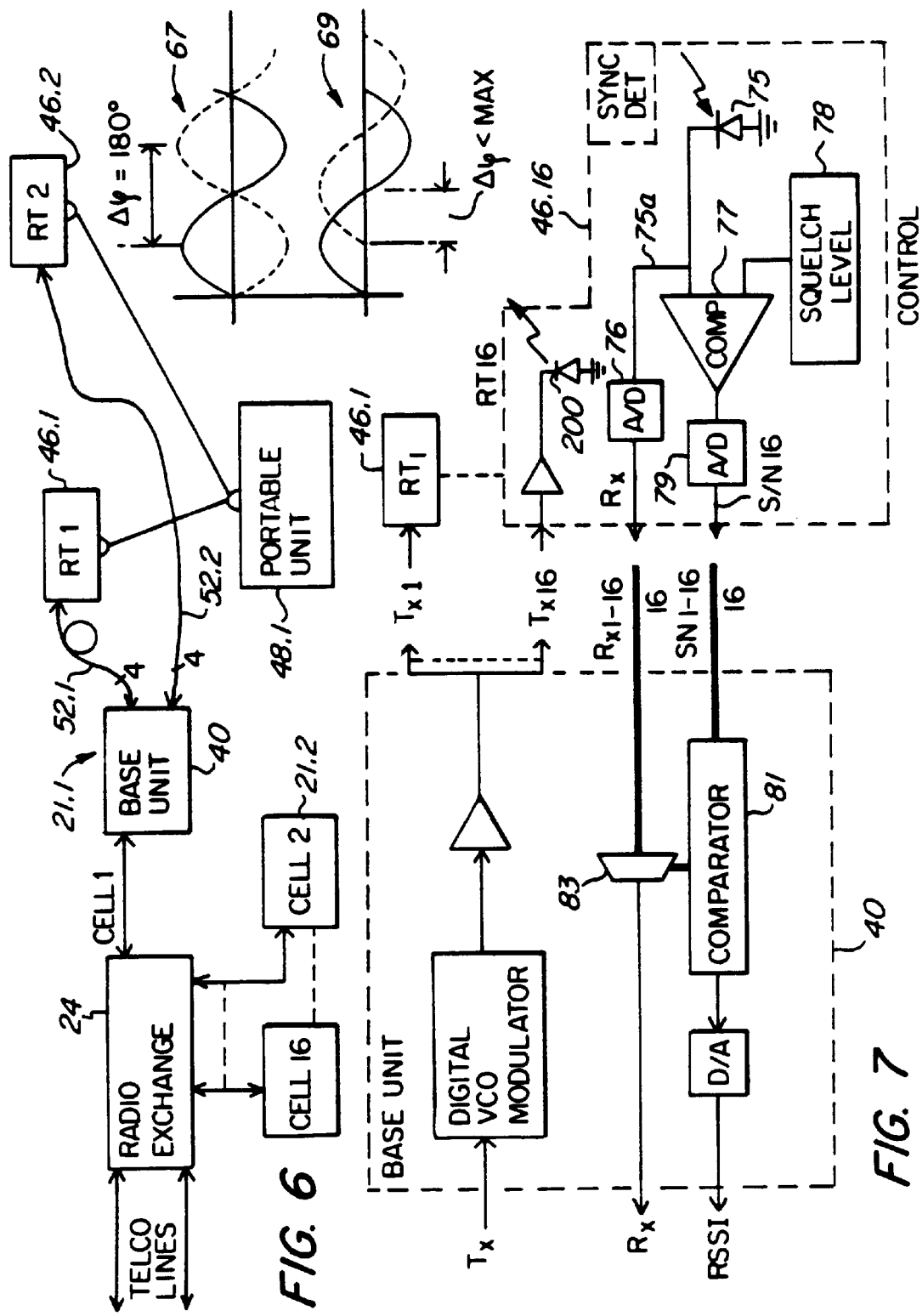

METHOD AND APPARATUS FOR CORDLESS INFRARED COMMUNICATION

Previous Application

This application is a divisional application of Ser. No. 08/624,852 filed Mar. 22, 1996 now U.S. Pat. No. 5,867,292 entitled Method And Apparatus For Cordless Infrared Communication and which is assigned to the same assignee as for this application.

FIELD OF THE INVENTION

This invention generally relates to a method and apparatus for communicating from a base unit to a plurality of portable infrared units located randomly throughout a building while using established communication protocols. More specifically this invention relates to a digital communication method and system for enabling a central control connected to telephone lines to communicate with a plurality of portable infrared devices, such as handsets and the like, located within an enclosed site.

BACKGROUND OF THE INVENTION

Several systems for digital communication with portable devices have been described. For example in an article entitled Cordless Personal Communications by a Dr W. Tuttlebee and published in the IEEE Communications Magazine of December 1992 at pages 42–53, various systems for digital cordless telephony are discussed. Much of such activity has taken place in Europe where several wireless data standards have emerged in recent years, such as the CT2, CT3 and DECT standards.

The principal function of such standards is to enable digital communication from a central control connected to telephone company lines to transfer calls to and from portable devices that may be at any location within a building. Standard cellular systems cannot adequately serve such function because of the long distance range of cellular RF signals and the need to accommodate a large number of simultaneous communications within a relatively small volume such as a building.

These wireless standards have been adopted so that both data and speech signals can be sent over RF frequencies between a central radio exchange and a large number of portable devices. These standards employ a time division multiple access/time division duplex/multiple carrier (TDMA/TDD/MC) approach. More simply put, digital signals to or from the radio exchange unit are sent in time slots. The communication thus occurs in frame signals of say twenty milliseconds long, with the time frame divided into say ten uplink or transmit slots followed by the same number of ten down link or receive slots. Each slot being one millisecond long. Each portable unit must respond to a signal addressed to it in one of the uplink slots in a corresponding downlink slot in the same frame signal.

In a radio frequency application of such a cordless digital communication system the number of simultaneous communications is limited by the number of available slots. If there are say ten slots, then for any one particular carrier frequency only ten telephone signals can be carried. In order to increase the capacity of the system additional carrier frequencies are employed typically about eight. Hence, for each cell, formed of a radio exchange unit, a total of eighty active telephone communications can be carried out.

These standard systems are designed to accommodate higher transmission requirements to and from any one portable unit by assigning additional slots, in which case the number of available slots for other portable devices is reduced. Furthermore, the RF communications are difficult to limit to specific areas within a particular building so that care must be taken that carrier frequencies in one cell do not interfere with those in another cell. For example, if such RF system is set up to operate communications on adjacent floors of a multistoried building, then a similar system on other floors must use sufficiently different carrier frequencies to avoid RF interference problems. Since the available RF carrier bandwidths tend to be limited, because of FCC or other governmental spectrum allocations, a need exists to enable practically unlimited digital cordless communications without interference problems.

Infrared communication systems are well known, see for example the U.S. Pat. Nos. 4,553,267; 4,757,553; 4,977, 619; 5,103,108; 5,319,191 and 5,351,149 to Crimmins. In the '619 patent a communication system is described wherein a base unit is hard wire connected to a plurality of stationary infrared transmitter and receiver (R/T) units distributed in an enclosure. An infrared portable unit can communicate with anyone of the RFT units to establish a two way communication link with the base unit.

A need exists to accommodate standards for RF or cordless telephone communications to infrared communications so that a large number of telephone connections can be made at the same time within a cell without interference problems in a reliable manner.

SUMMARY OF THE INVENTION

With an infrared cordless communication method and system in accordance with the invention the channel limitations of radio frequency digital cordless systems can be avoided and a high density of portable infrared terminals can be accommodated without interference problems while using standard communication protocols for RF cordless systems.

This is achieved in accordance with one form of the invention by distributing stationary infrared RT (receiver/ transmitter) modules throughout a building area and connecting these to a base unit that in turn is connected to a radio exchange unit for RF cordless systems. The RT modules are located to cover a desired area so that portable IR units in the building area can communicate through the RT modules with telephone lines connected to the radio exchange unit. The signal paths delays between the base unit and the RT modules are effectively made substantially the same for at least those RT modules that are in each other's vicinity. As a result infrared carrier frequencies incident upon any one portable unit from several nearby RT modules will not be significantly out of phase.

The signal path delays can be equalized by employing similar cable lengths between the base unit and nearby RT modules. In another technique described in accordance with the invention signal path delays are equalized by introducing appropriate delays of signals sent to and from the base unit and the RT modules. Signal path lengths are continually monitored and appropriate delays are automatically introduced for each signal path.

Since one or more RT modules may be sending signals to a base unit from the same portable unit another aspect of the invention is the selection of the best portable signal. For example, when a portable unit responds in a time slot, several RT modules may receive the signal and forward it to the base unit. As a result the base unit, prior to actually receiving the signal from the RT's, makes a selection of the best signal based upon information sent to it by the RT modules. This selection is made for each slot transmission and enables the best signal to be used for the communication even while the portable unit is moving between RT modules in the building area.

With an infrared communication system in accordance with the invention the number of infrared portable units that can be connected by a base unit can be made quite flexible and much higher than the number that is available using conventional RF techniques. This can be done by the use of hubs each of which can be connected to a number of infrared RT modules. For example, if a base unit has sixteen ports, each of which could be connected to RT modules the number of RT modules can be increased by the use of hubs. Each hub having, for example, sixteen module connectable ports so that a total of 256 RT modules can communicate with a single base unit. As a result one base unit can serve a high density of portable users.

Each base unit can be considered as a separate cell designed to serve a particular area and yet be able to establish cordless digital telephone communication in a flexible manner. A number of different cells can be arranged, as the circumstances may require, with each cell enabling a separate telephone communication with a number of different infrared portable units. One could thus set up several cells on each floor of a large building so that a sufficient number of different simultaneous telephone communications can be established even though the cells adjoin each other, being only separated by an infrared opaque wall.

It is, therefore, an object of the invention to provide a cordless infrared communication system within a building with which a large and practically unlimited number of standard data and voice type telephone connections can be made.

It is a further object of the invention to provide a flexible cordless infrared communication system with which a high density of infrared portable units can be used.

These and other objects and advantages of a cordless infrared communication system in accordance with the invention can be understood from the following detailed description of several embodiments as shown in the drawings.

BRIEF DESCRIPTION OF THE DRAWINGS

FIG. 1 is a schematic block diagram representation of one infrared communication system in accordance with the invention;

FIG. 1a is a partial representational view of a cable used in the IR system of FIG. 1;

FIG. 2 is a schematic representation of a building to illustrate the advantages of the infrared communication system in accordance with the invention;

FIG. 3 is a schematic representation of a conventional cordless RF communication system;

FIG. 4 is schematic representation of a typical signal frame used in the communication system shown in FIG. 3;

FIG. 6 is a partial block diagram view of the infrared communication system shown in FIG. 1;

FIG. 7 is a partial block diagram view of a portion of the infrared communication system used to select the optimum signal from the infrared RT modules;

DETAILED DESCRIPTION OF THE DRAWINGS

Figure 4A:
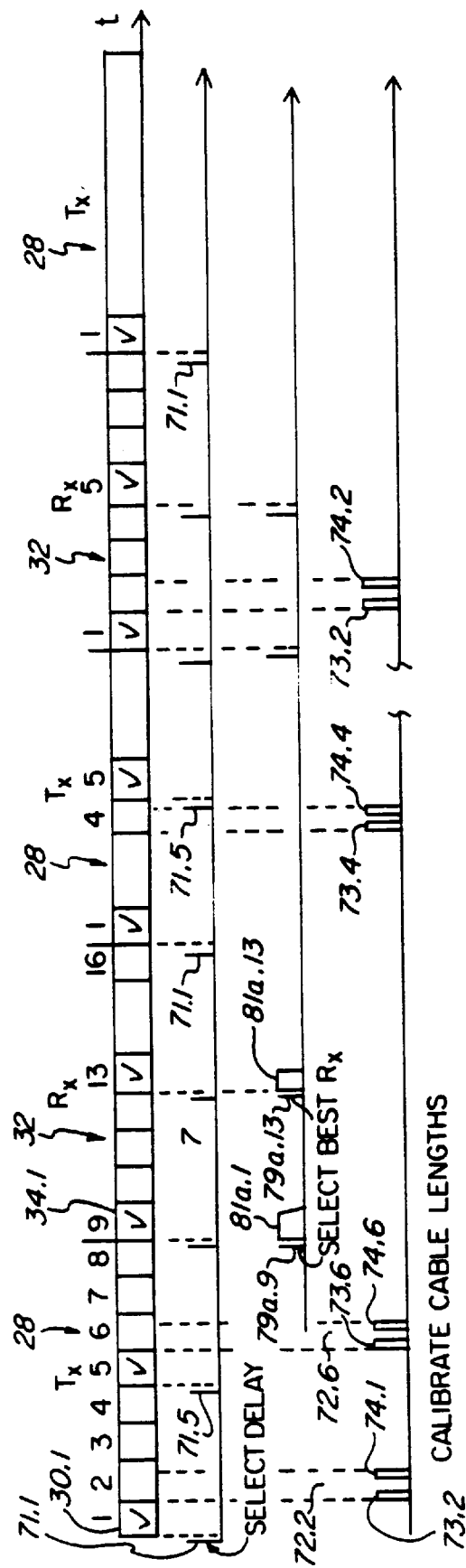
FIG. 4a is a timing diagram for illustrating the flow of signals in an IR communication system in accordance with the invention.

With reference to FIGS. 1 through 4 an infrared (IR) communication system 20 in accordance with the invention is shown connected to telephone lines 22 through a radio exchange 24. The IR system 20 is made to operate with the protocols associated with a standard RF cordless communication system known as the CT3 system. However, other systems such as compatible with the DECT protocol can be used.

The use herein of cables crossed by a slash line and a number next to that line means the use of a number of paths in that cable equal to the number next to the slash. Some cables such as 54 have four twisted pairs indicating the use of four transmission paths though eight conductors may be involved. In other lines sixteen paths are used with as many conductors.

Also used herein is the practice of identifying items that are alike with the same number but with a decimal point and a number on the right of it to indicate particular ones of the items.

The CT3 RF cordless standard employs a DECT type digital communication wherein a TDMAITDDIMC system operates just below 2 GHz. The CT3 system employs a 16 ms frame cycle 26 formed of a transmit segment 28 using 8 transmit slots 30 and a receive segment 32 using 8 receive slots 34. Each slot 30 or 34 is one millisecond in duration and a transmission within a slot includes 480 data bits formed of fields as illustrated at 36. The system operates in such a way that when, for example, a transmission from radio exchange unit 24 arises by virtue of an incoming telephone call on an incoming line 22, a digital signal is placed in one of the outgoing or transmit slots 30 and is followed by a response in the same frame in a receive slot 34. Note that different frame lengths can be employed in different protocols as for example the ten slots used in the DECT system as described in the above mentioned IEEE article.

The infrared system 20 for a cell 21.1 is formed of a base unit 40 which communicates with a CT3 or DECT type controller or interface 42 to enable digital communication with system 20. System 20 further may be composed of a number of hubs 44, which in turn are connected to one or more stationary infrared receiver/transmit (RT) modules 46 distributed in a building. The RT modules 46 in turn communicate with portable or cordless infrared devices 48 such as telephones. The RT modules 46 may be directly connected to the base unit 40 such as is shown for modules 46.17–46.24.

The use of hubs 44 and the distribution of RT modules 46 can be as varied as the circumstance require, it being understood that the distribution and connections of RT modules in FIG. 1 is for illustration purposes and is not intended to be required.

The base unit 40 is connected to RT modules and to hubs 44 by way of twisted pair cables 52. Each cable 52, as shown in FIG. 1a is formed of four twisted pairs of conductors 54.1–54.4 to respectively conduct distinct signals, namely, the transmit segment Tx, 28 of the frame signal 26 on pair 54.1, the receive segment Rx, 32, on pair 54.2, a signal to noise ratio signal on pair 54.3 and electrical power for the RT modules 46 on pair 54.4. The arrows are indicative of the direction of signal flow on the respective pairs 54. The use of a double headed arrow on signal pair 54.1 indicates that this pair is used to transfer signals in both directions, but at different times as will be further explained.

With an infrared communication system in accordance with the invention a substantial advantage is achieved over a conventional RF type system as illustrated in FIG. 3. There, the Telco lines 22 enter a radio exchange 24 and are passed on by it to RF base cells 60 connected to antennas 62, The digital RF signals are sent to portable devices 64 which can roam over a large area within or outside a building while maintaining contact for communication with the radio exchange 24.

The effect of the large area coverage of any one RF cell is illustrated in FIG. 2 wherein a building 66 of many floors 68 is shown. Any one base cell 60, such as cell 60.1 tends to range over a volume of space that encompasses a number of floors as illustrated with the dashed line 70. As a result the number of portable devices that can be distributed or used within the cell is limited by the number of available slots in the DECT or CT3 type communication system. This then employs multiple carriers to increase the available channels, but because of the spectrum allocation limitations still may be inadequate for accommodating the required number of portable devices 64.

In contrast, when an infrared communication system 20 in accordance with the invention is used, each floor can be provided with one or more hubs 44 and as a result many RT modules 46 can be made available to accommodate as many infrared portable devices 48 as are needed. Signals between a hub 44 and a portable device 48 do not spill over onto unwanted areas, such as separate floors and thus security and interference problems are avoided.

In IR communication system 20 signals are transferred between the radio exchange and the portable units 48 in compliance with the established protocol by inserting special signals and using signal lines for particular purposes as depicted in the view of FIG. 4a. A signal pattern as shown in FIG. 4 has for illustrative purposes transmissions occurring during slots 30.1, 30.5 (indicated by check marks) and as a result response signals in receive slots 34.1 and 34.5 also evidenced by the check marks in these slots.

Just prior to the sending of a transmission in a slot 30, system 20 inserts a delay 71 to assure that the transmissions destined for nearby RT modules 46 arrive at the same time. The reasons for this can be explained with reference to FIG. 6 in which a base unit 40 is shown connected by cable 52.1 and 52.2 of different lengths to RT modules 46.1 and 46.2 respectively. As a result the IR carrier energy arriving at a portable unit 48.1 may include portions from both nearby RT modules and differ in phase, depending upon the different signal path lengths from the base unit 40. If the signals are about 180 degrees out of phase as shown at 67, the net effect at a portable unit 48 is a cancellation of IR carrier signals, in effect a null, and thus adversely impacts communication with that portable unit.

Hence, it is desired that the signal path lengths from the base unit to RT modules 46 which are near each other be made about the same. This means, in accordance with one embodiment of the invention, inserting a delay for the signal placed on the cable 52.1 and of sufficient duration to reduce the phase difference, delta phi, attributable to cable lengths variations to a maximum of about ninety degrees (¼ wavelength) as illustrated at 69.

For simplicity, the inserted delays are selected so that transmissions from a base unit during any one slot arrive at all the RT modules 46 at the same time. The delays are first automatically determined as shown in FIG. 4a during those intervals such as 72.2 and 72.6 when slots, such as 30.2 and 30.6, do not require a transmission. Delays are measured by sending a pulse signal 73 from the base unit 40 to each of the RT modules 46 and measuring the time for a return signal 74 to arrive from that module.

Measuring of delays need not be done every time there is no transmission. Hence, a counter is employed to allow measuring of delays at some increased time interval.

Another feature of IR system 20 arises from the possibility that more than one RT module 46 responds to the return transmission from a portable device 48. IR system 20 selects the best RT module signal just prior to the occurrence of the return transmission. As shown in FIG. 7 an RT module 46 includes a photo detector 75 responsive to IR signals from portable devices 48. The output of the detector 75, after amplification, is passed onto an analog to digital converter 76 to produce a digital Rx receive signal for return to the base unit 40.

A signal strength indication is generated at the output of a comparator 77 after it has compared the output from the photo detector 75 with a squelch level signal from a squelch generator 78. The signal strength indication is also converted to digital form with a fast A/D converter 79. This A/D converter generates a three bit signal strength signal with each bit placed on a separate line 54 for return to the base unit 40.

As shown in FIG. 4a the fast analog to digital conversion of the signal strength is sent at 79a to the base unit 40 before it receives the Rx receive slot signal 34. A selection of the strongest signal is then made at 81a. This is done at 81 shown in FIG. 7, and used at 83 to pass the best Rx signal on to the radio exchange unit 24. This selection of the strongest signal is also used to choose a best RSSI signal. An RSSI signal for each receive slot 34 may be required by the CT3 or DECT protocols and represents the strength of the received portable IR signal at an RT module 46.

Figure 5:
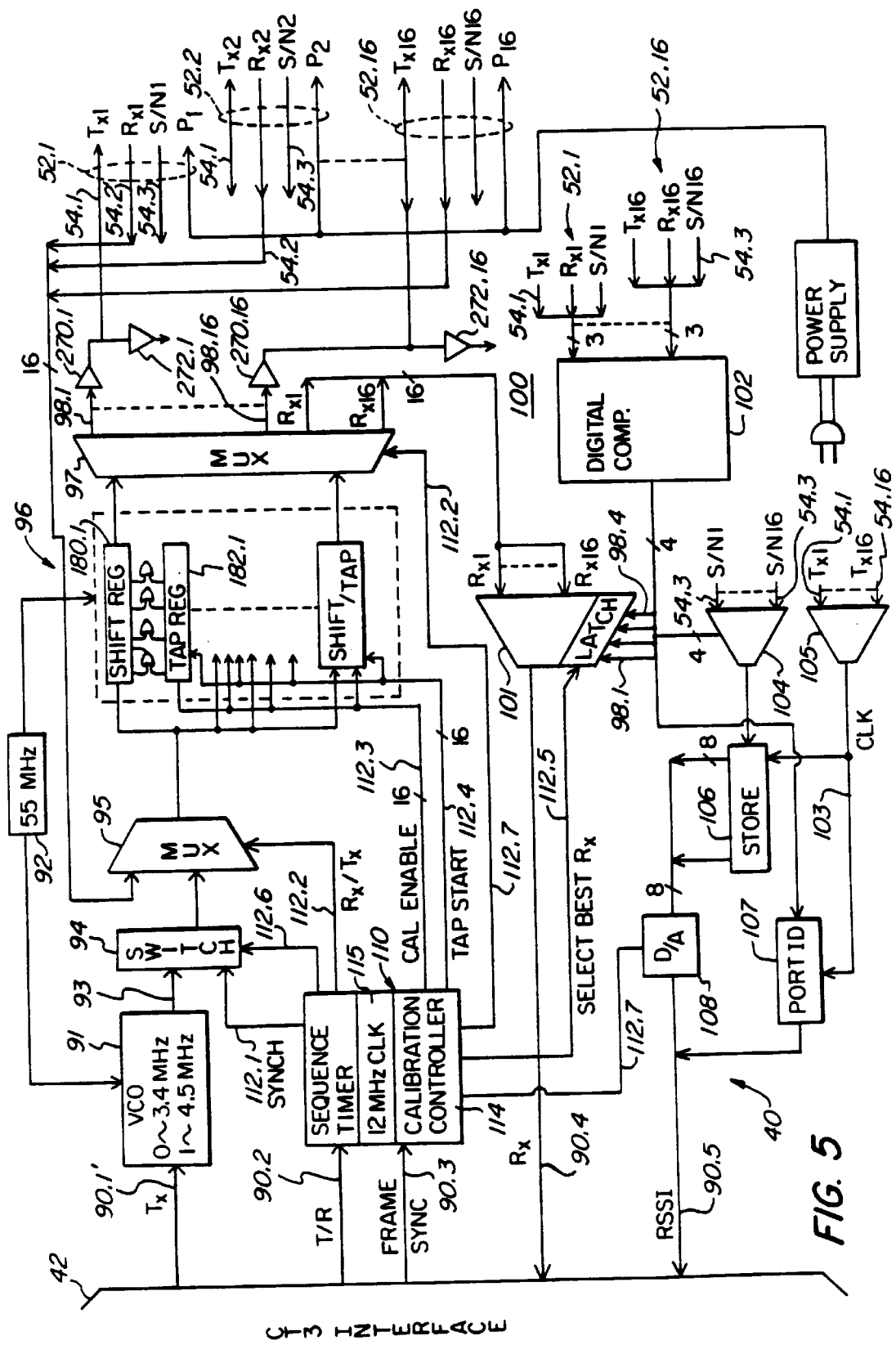
FIG. 5 is a block diagram of a base unit employed in the infrared communication system shown in FIG. 1.

With reference to FIG. 5 one form of a base unit 40 in accordance with the invention is shown in further detail. Signals to and from a conventional CT3 radio exchange interface 42 occur on lines 90.1–90.5. These signals are respectively a serial digital transmission signal $T_x$, on line 90.1; a logic control signal T/R on line 90.2; a frame logic signal on line 90.3; a received signal $R_x$ on line 90.4; and a signal strength indication RSSI signal on line 90.5.

The transmission signal $T_x$, destined for all RT modules in a cell 21, is applied to an FM modulator 91 wherein a digital voltage controlled oscillator, in response to an input from an oscillator 92 at 55 MHz, produces zeroes represented by a frequency at 3.429 MHz and ones at a frequency of 4.571 MHz. Different frequencies can of course be employed. The output 93 from the modulator 91 is applied to an electronically controlled switch 94 and then through a multiplexer 95 to a delay network 96. The delay network 96 delays the transmission signal $T_x$ by an amount that is sufficient to assure that transmissions, from at least those RT modules 46 which are near each other, occur at essentially the same time. For simplicity the delays are selected so that transmissions from RT modules 46 during any one slot occur essentially at the same time.

Hence, the transmission signal $T_x$, destined for each individual RT module 46, is delayed a particular amount, depending upon the length of the cable connecting that module to the base unit 40. The delays are selected so that they are equivalent to the delay caused by the longest cable length involved.

The delayed $T_x$ signals are then passed through a multiplexer 97 onto the transmitter lines 54.1 of the various cables 52 leading to the hubs 44 and RT modules 46. This process is continued for each of the $T_x$ signals in the respective transmission slots 30 of a frame signal 26.

The lines 54 are twisted pairs and are driven by amplifiers 98a and terminated with receivers 98b. These amplifiers and receivers enable a tristate condition on the lines 54 so as to preserve power when no transmissions are to occur and permit two way signal flow when this is needed as for the transmission lines 54.1. The tristate condition is regulated by signals generated from a controller 114 as hereafter described.

During the receive cycle each of the RT modules 46 which had passed on a $T_x$ signal to the portable devices 48 returns a receive signal $R_x$ to the base unit 40 in the slot which corresponds to the transmission slot in which the $T_x$ signal being responded to was located. In addition, a signal indicative of the signal strength of the infrared signal received at the RT modules, from the portable devices 48 sending a response, is transmitted to the base unit as an S/N signal.

Since the receive signals arrive at the base unit 40 at different times, because of the delays imparted by connecting cables 52, the receive signals $R_x$ from the respective RT modules and hubs are passed through the delay network 96 to undergo delays of the same duration as the delays imparted to the corresponding transmission signals $T_x$. The sixteen receive signals $R_x$ on cable lines 54.2 are, therefore, coupled to the input side of the multiplexer 95 and then passed through the delay network 96 to essentially arrive simultaneously at the output lines 98 of multiplexer 97.

During the receive segment 32 of a transmission, several receive signals $R_x$ from different RT modules 46 are presented and the base unit 40 includes a network 100 to select that signal representative of the best available $R_x$ signal. The $R_x$ signals are applied to a multiplexer 101 where the best receive $R_x$ signal is selected and placed on line 90.4 leading to the interface 42. The best $R_x$ signal is selected with control signals on lines 98 derived from a digital magnitude comparator 102.

The latter comparator 102 compares signals on input lines representative of the signal to noise ratios of the infrared inputs to the RT modules as previously described with reference to signals 79a and 81a in FIG. 4a. As explained, this comparison is done at a time preferably just prior to the applicable receive slot. The selection of the best receive signal $R_x$, therefore, occurs during a very brief interval between slots 30 as will be further explained.

The control signals on lines 99 are also applied to a multiplexer 104 whose inputs are connected to the respective signal strength lines 54.3 from the various hubs 44 and RT modules 46. The best signal strength signal is selected for each slot 30 and stored in a register 106 with a clock signal presented on the $T_{x1-16}$ lines 54.1 from the RT modules 46. The clock signal is presented on the output line 103 of a multiplexer 105 whose input lines connected to lines 54.1. The value of the signal in the register 106 is converted by a digital to analog converter 108 to an analog signal and presented on line 90.5 as the RSSI signal associated with the slot 34 to which the receive signal $R_x$ relates.

The identification of the best $R_x$ signal with control lines 99 can be used as 20 an indication of the location of the portable which was the source of the receive signal. The control signals on lines 99 identify the port where the receive signals arrived and are stored in a register 107. The port identification signals are clocked out onto the RSSI line 90.5 with the clock signals on line 103 from multiplexer 105.

Control over the operation of the base unit 40 and the functions of the above described networks is obtained with a sequencer 110. This may be in the form of a micro processor with appropriate programming. However, the speed with which the required signals have to occur makes it desirable to employ discrete circuits. The sequencer 110 produces appropriate control signals with which the various functions of the base unit 40 accomplishes its tasks.

Hence, in response to the T/R and frame signals, on lines 90.2 and 90.3 respectively, the sequencer 110 produces timing signals such as a sync signal on line 112.1, a transmit enable signal on line 112.6, a transmit or receive selection signal on lines 112.2 and 112.7 to set up the appropriate mode in the multiplexers 95 and 97 respectively and a calibration enable signal on lines 112.3. In addition the sequencer generates tap register enable signals on lines 112.4 and a best receive selection signal on line 112.5. The sequencer includes a calibration controller 114 and a 12 MHz clock 115 with which the electrical delays produced by the cable lengths may be repetitively measured and then used to set the appropriate delays. Selected ones of these signals also control the tristate conditions of several amplifiers 98a and receivers 98b employed at the base unit 40 to drive the lines 54.

Figure 8:
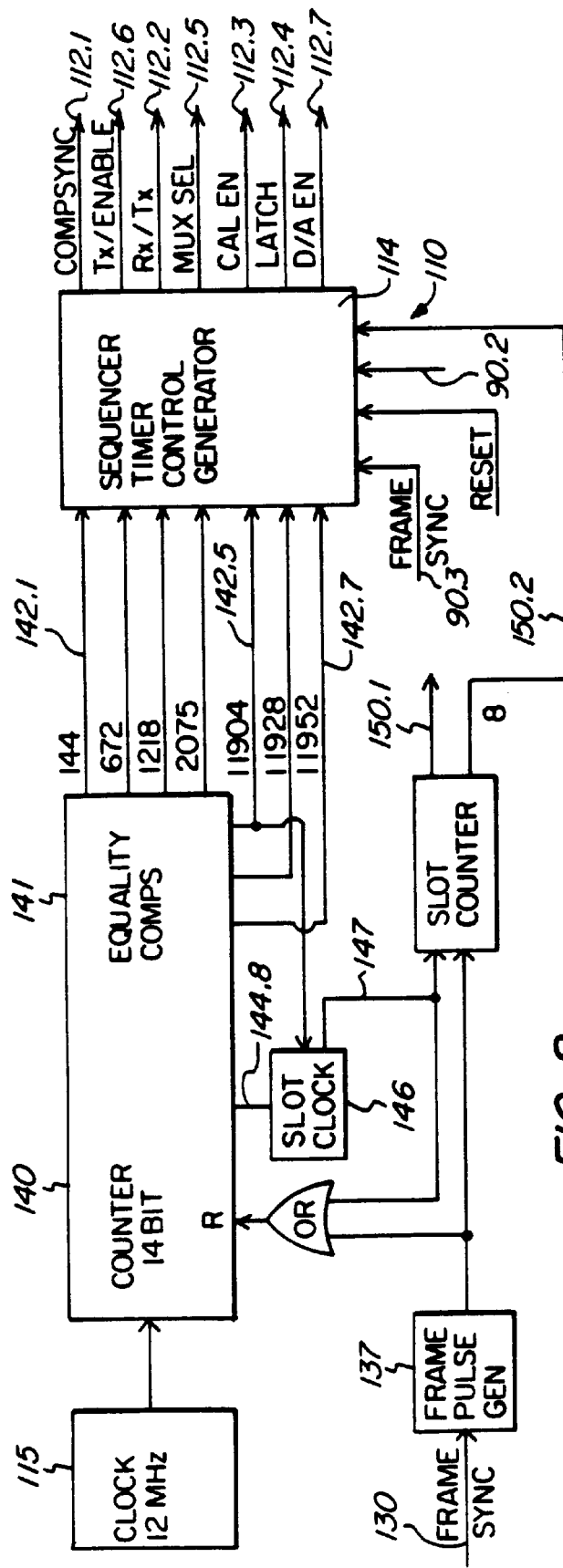
FIG. 8 is a block diagram for generating timing signals used in the system of FIG. 1.

Before describing the hubs 44 and RT modules 46 in greater detail, the operation of the infrared system 20 in accordance with the invention can be best understood with reference to FIGS. 4, 5, 8 and 9A–9C. A frame sync signal as appears on line 90.3 in FIG. 5 is a square wave 130.1, see FIG. 9A, having equal transmission and receive segments 132 and 134 corresponding to the transmission and receive segments 28 and 32 shown in FIG. 4. The transition 136 from a transmit segment 132 to a receive segment 134 is a timing reference used to initiate certain timing signals as shown in FIG. 8.

The frame sync signal 130 is, therefore, connected in the sequencer 110 to a frame pulse generator 137 which causes a resetting of a fourteen bit counter 140 driven by 12 MHz clock 115. Certain counts achieved inside counter 140 are decoded with a comparator 141 as indicated on lines 142 with the count number placed adjacent the lines 142. When the register is full a pulse is applied to drive a slot clock 146 and its output pulses counted in a slot counter 148. This circuitry thus produces timing signals on lines 142 to cause certain events to occur during a slot and to enable the slots 30 and 32 in a frame 26 to be counted. The numbers placed along the lines 142 signify the count in the register 140 that yields an output on that line with reference to the frame transition 136 in the frame sync signal.

Figure 9A:
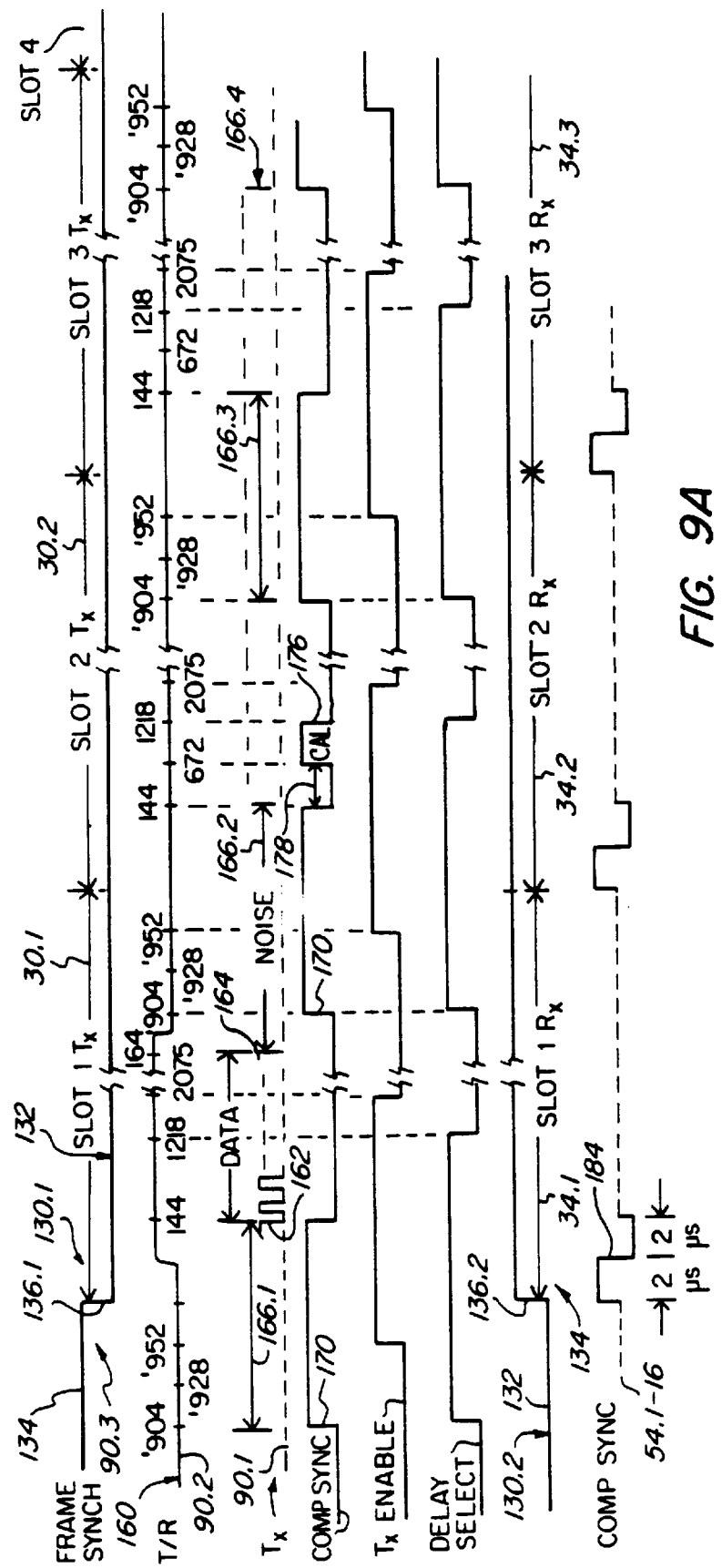
FIG. 9A is a timing diagram of certain signals generated in the infrared communication system of FIG. 1.

The T/R logic signal 160 on line 90.2 in FIG. 5 from the radio exchange unit 24 signifies when a transmission occurs during a slot 30. In FIG. 9A an illustrative example of a T/R signal 160 is shown wherein a transmission is to occur in the first slot 30.1 and none in the subsequent slots 30.2, 30.3. and 30.4. The occurrence of the various timing signals on output lines 142 and obtained from the register 140 are depicted on the T/R signal line 160 as shown, with the larger counts being abbreviated as illustrated with apostrophes.

As shown in FIG. 5 data for transmission is sent on line 90.1 commencing with the count of 144, see FIGS. 8 and 9A. The transmission begins at a time identified also by numeral 162. Transmission ends at the end of sending a fixed number of 480 bits, as explained with reference to FIG. 4, at a time identified at 164 shown in FIG. 9A. The end of transmission occurs just prior to the timing signal on line 142.5 bearing the count 11904. The time period following the transmission of the last bit until the next count of 144 is an interval 166 associated with time between sequential transmission slots 30.

During intervals 166 any signals occurring on the data line 90.1 from the radio exchange 24 can be construed as noise and transmissions can and are inserted by the base unit 40 to the hubs 44 and RT modules 46 as well as received from these devices for the operation of the communication system 20.

One calibration mode of operation that is preparatory for the functioning of the IR communication system involves an automatic determination of the length of delay needed to assure that adjacent or nearby RT modules 46 are activated for transmissions at substantially the same time. This employs a transmission of a special sync signal 170, see FIG. 9, commencing on a line 172, see FIG. 5. The sync signal is passed through the multiplexer 95, and delay measuring and applying network 96 and sent out on an output line 54.1 of a cable 52 to a particular RT module 46. The sync signal is recognized by virtue of its unique duration by the RT module 46 to which it is sent.

Upon recognition of the sync signal 170 the RT module returns a response 176, see FIG. 9A, to the base unit 40 on the same transmission line 54.1 on which the sync signal is sent. The response 176 is initiated upon detection of the sync signal at the RT module 46. The arrival of the response 176 at the base unit 40 is detected by the delay measuring network 96. The time of the arrival of the response 176 is indicative of the roundtrip travel interval 178 of signals along the cable 52.

The base unit 40 measures the delay imparted by the length of the cable 54 connecting the base unit 40 to the RT module 46 by counting the pulses from oscillator 92, see FIG. 5, in a shift register 180 associated with the particular RT module 46. These pulses are counted starting from the time that the sync signal 170 is first sent until the arrival of the response 176. The count accumulated in the register 180 is then representative of twice the length of the cable 52 between the base unit 40 and an RT module 46. Since the count represents the roundtrip distance, the count is divided by two, obtained with a simple shift of the count in the register 180, and then stored in a tap register 182 as equivalent to the required one way trip delay.

The delay count in a tap register 182 is so coupled to an associated shift register 180 that the delay count determines where along the shift register 180 a transmission of data to is to begin entering the shift register 180. In this manner a small delay count, representative of a relatively long cable 52, causes data to be entered towards the input end of a shift register 180. A large count on the other hand causes data to be entered towards the output end of a shift register 180.

Hence, data destined for a nearby RT module 46 will be delayed longer and data for a farther RT module 46 will be delayed less by the shift registers 180. In the aggregate, however, taking into account the additional delays imparted by the cables 52, data will arrive at RT modules 46 at the same time.

The process for determining the cable delays is initially carried out for each of the RT modules 46 as the system is started up. Once the system is operational the delay calibration is continued on a repetitive basis depending upon the traffic of data along the cables 52, i.e. the availability of a transmission slot 30.

The sequencer 110 provides the appropriate timing signals for the system with the calibration controller 114. This regulates, with the T/R line 90.2 and the frame sync line 90.3 from the radio exchange interface 42, and produces signals for enabling transmissions in a slot. It also generates the control signals on lines 112 needed to establish a delay calibration for a slot if this has not been done within a predetermined time or after a certain number of transmissions. This circuitry needed to generate signals can be produced with an array logic or such other suitable programmed microprocessor.

During operation of IR communication system 20 signals representative of data or voice information is sent in slots 30 to all of the RT modules 46 either directly from the base unit 40 or through a hub 42. The slot signal assigned to a particular portable unit 48 is so loaded into a shift register 180 associated with a particular RT module 46 as to be delayed in time in proportion to the delay previously measured for the associated cable 52 and stored in the associated tap register 182.

Since during transmission each slot signal is sent to all of the RT modules 46 in a cell, the sequencer 110 enables the loading of each transmission slot signal into all of the shift registers 180. Signals are shifted out of the registers 180 onto the output lines 54.1 in each cable 52 to arrive substantially at the same time at the RT modules 46.

At the end of the transmission cycle 28, see FIG. 4, those portable units 48 which had been addressed with a particular slot signal must, if a response is to be produced, do so during a receive slot 34 assigned to be associated with a particular transmission slot 30. If no response occurs then the radio exchange 24 assumes that the portable device is not active.

The response is generated at a time dependent on the slot of the transmission signal that caused the response. This is done in a manner as is well known in CT3 or DECT type communication systems. Suffice it to note that the return signals, known and described herein as receive signals, are preferably placed in the receive slot 34, see FIG. 4, which corresponds to the position of the transmission slot 30 in the transmission cycle 28.

In the RF version of a CT3 system there is one receiver for a cell 21. In the IR communication system 20 a single cell contains a large number of possible IR receivers in the form of RT modules 46. Since several RT modules 46 near a portable unit 48 are likely to generate receive signals it is desired to provide the radio exchange unit 24 with the best signal at one of these RT modules. The best signal is to be selected for each receive signal slot 34. The best signal can then also be made available as an RSSI (receiver signal strength) signal for transfer to the radio exchange unit 24 as representative of the signal strength at the receiver from the respective portable unit from where the signal originates.

In system 20 a best signal selection is done just prior to the start of each active receive slot 34. As illustrated with reference to FIG. 9A the receive segment 134 of a frame signal 130.2 is shown in synchronized relationship with the frame signal 130.1 shown above it for the transmission cycle. Several receive slots 34 are illustrated and in response to the occurrence of a transmission in transmission slot 30.1 a response is to be sent back in slot 34.1.

Recognition of the beginning of a receive slot commences at the base unit 40 and with its recognition of the transition 136.2 in the frame sync signal 130. When the frame sync signal transition 136.2 occurs, see FIG. 9A, the control signal generator 114 produces on line 112.1 a sync square wave pulse 184 composed of two microsecond segments. This start-receive slot sync pulse 184 is sent out to the RT modules at the beginning of each receive slot 34 in response to the slot clock signals on line 147, see FIG. 8.

Hence, when an RT module 46 detects the receive slot sync signal 184 the RT module 46 samples the received IR signal strength. The sampled value is then immediately transmitted to the base unit 40 before beginning a transmission of a signal in a receive slot 34. This can be understood with reference to the timing diagrams of FIGS. 9B and 9C.

Detection of the receive slot start sync signal 184 is promptly followed by a fast A/D conversion of the IR signal detected by the photo detector 75, see FIG. 7, during an interval 166, see FIG. 9A, between slots. The fast A/D conversion occurs after the start at 186 of the portable IR carrier for a receive slot transmission and allowing at 187 for settling of the output 188 from an amplitude detection circuit, not shown, for the IR signal.

Figure 9B:
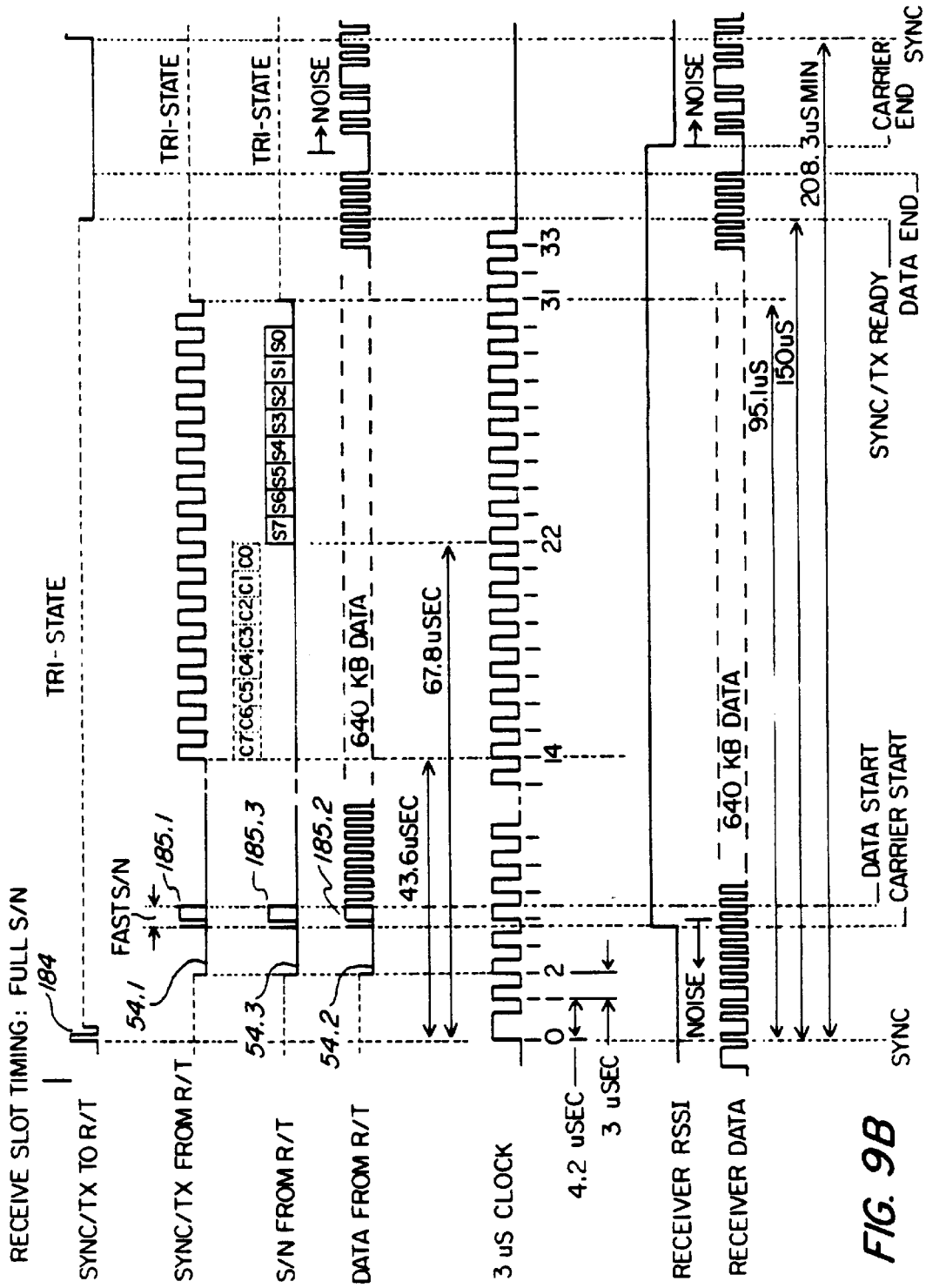
FIG. 9B is a timing diagram of certain signals generated during a receive slot when signals from a portable unit are sent by an RT module back to the base unit.
Figure 9C:
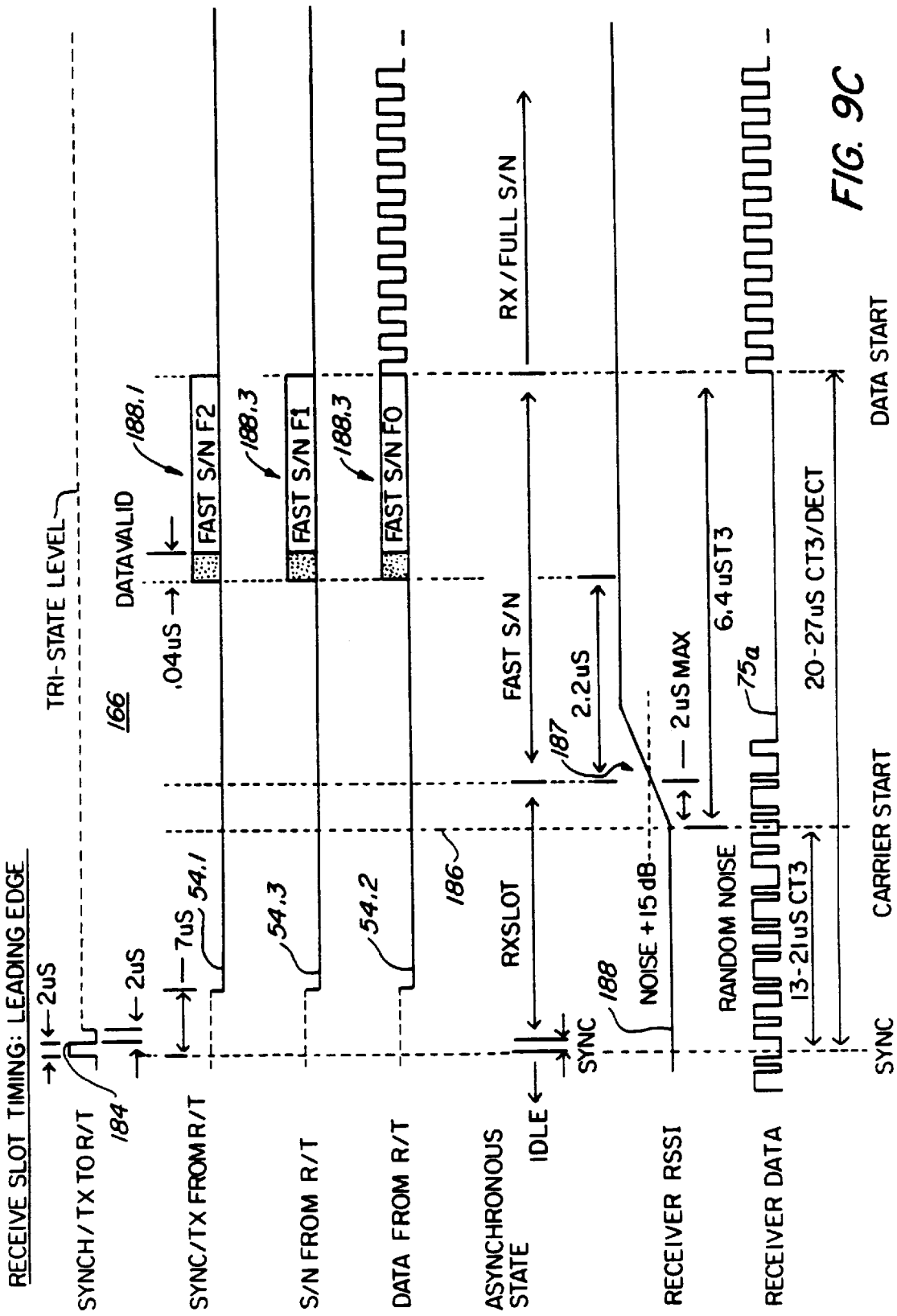
FIG. 9C is a timing diagram on an expanded time scale of the leading portion of a receive slot.
Figure 10A:
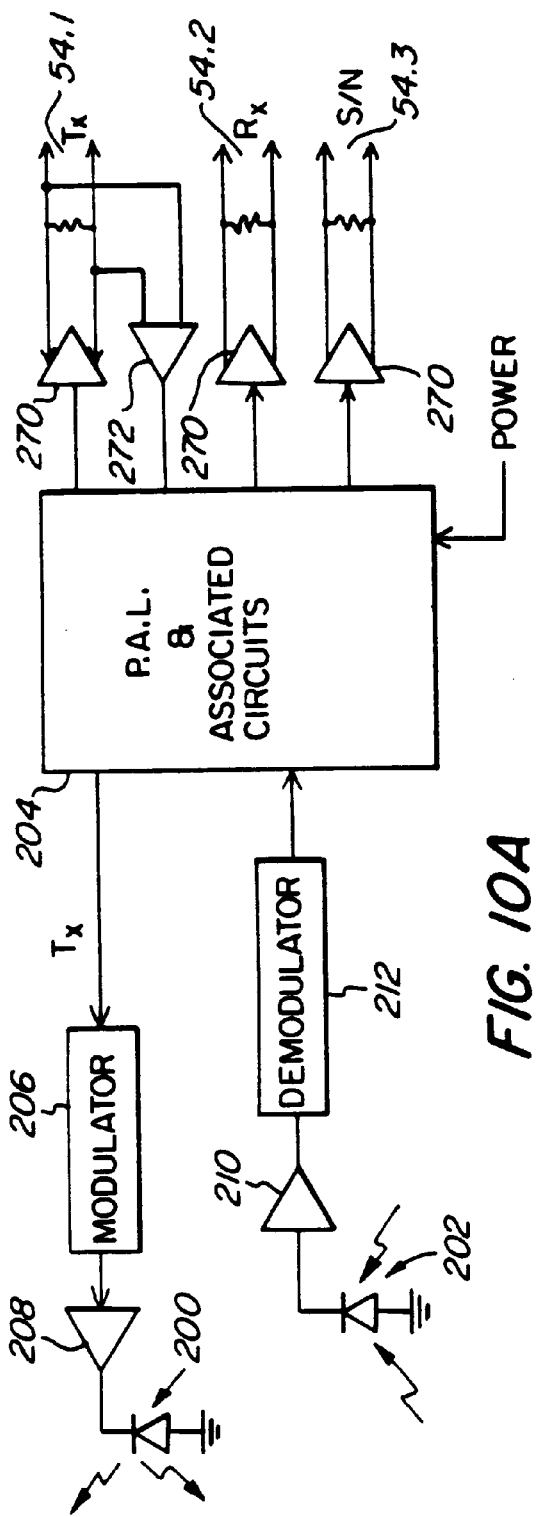
FIG. 10A is a block diagram view of an infrared RT module used in accordance with the invention.
Figure 10B:
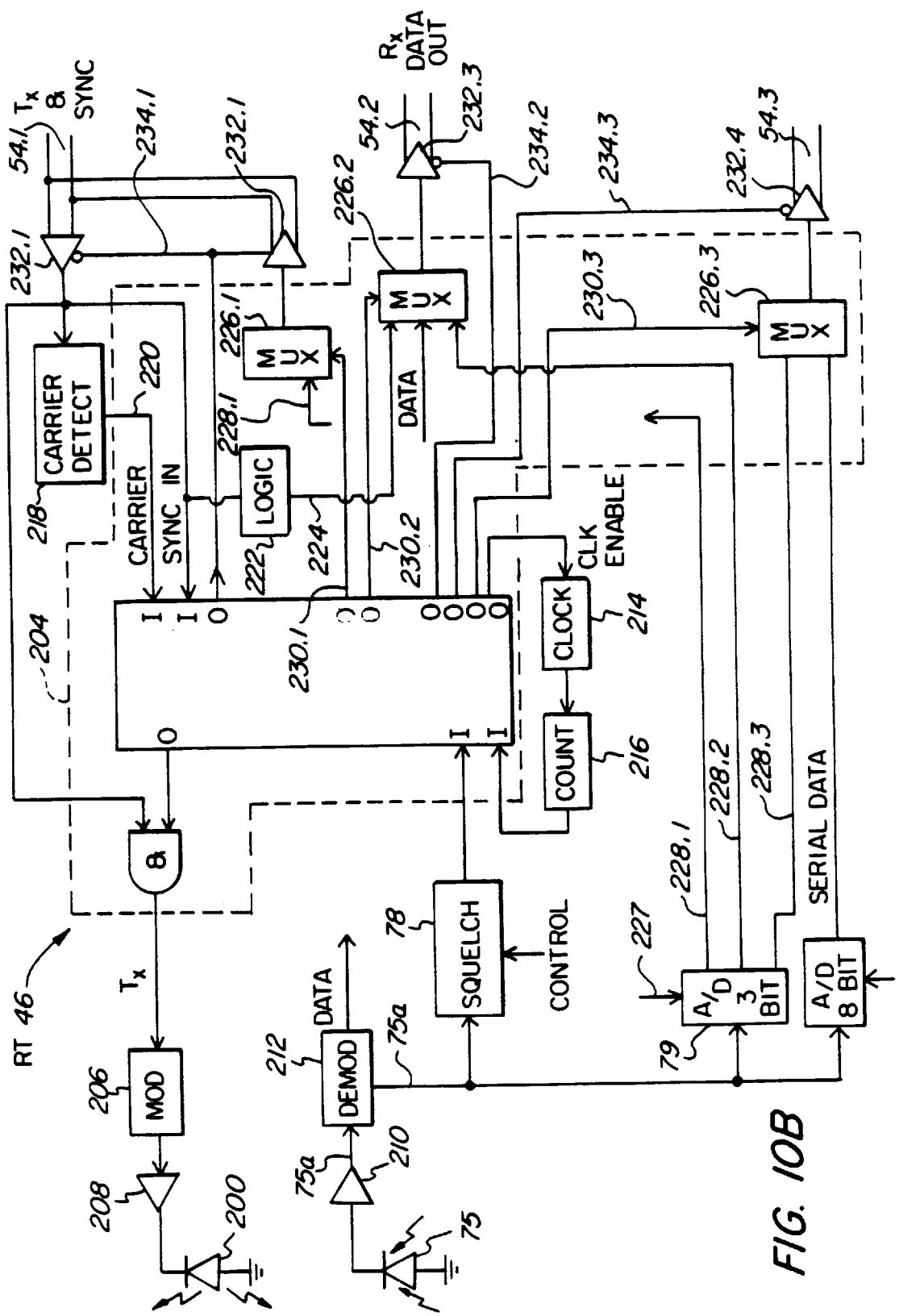
FIG. 10B is a more detailed block diagram view of an RT module used in accordance with the invention

Since the interval 166 during which the fast A/D conversion is done is quite short the three bit output from the A/D converter 79, see FIG. 7, is applied in parallel as shown at 188 in FIGS. 9B and 9C, to the lines 54.1, 54.2 and 54.3 in the connected cable 52. FIG. 10B shows the circuitry used to provide the described functions for an RT module 46. An IR transmitter 200 for sending IR signals to portable units 48 and an IR detector 75 for detecting responses from portable units are used.

The RT modules 46 include a programmable array logic (PAL) and other appropriate circuits 204 (enclosed by the dashed line in FIG. 10B) for processing inputs and outputs. The transmission inputs on line 54.1 from the base unit 40 or a hub 44 are passed on to a modulator 206 and amplifier 208 for activating the IR transmitter 200. The transmitter 200 may use a suitable number of IR generating diodes 200 in a manner as is well known in the art to produce the desired IR signal output to the portable units 48.

An amplifier 210 and a demodulator 212 are used to respond to IR signals from the portable units 48 to produce electrical signals for transmission to the base unit 40, either directly or through a hub 44.

P.A.L circuit 204 employs an external clock 214 which drives a counter 216 to produce clock pulses at three microsecond intervals. A carrier detection circuit 218 is used to detect the arrival of a transmission on the transmit line 54.1 and apply a signal to that effect on line 220. The transmit line 54.1 is also directly applied to circuit 204 to enable it to detect appropriate data and logic conditions. A logic network 222 detect the presence of a calibration sync pulse 176, see FIG. 9A. The logic circuit 222 generates a response signal on output line 224 which is returned to the base unit 40 via a multiplexer 226.2 for the previously described cable delay calibration.

The fast three bit A/D converter 79, which is controlled by a signal on line 227 from the P.A.L. circuit 204 has outputs 228.1–228.3 respectively applied to multiplexers 226.1–226.3. The operations of the multiplexers 226 are controlled with signals on lines 230.1–3 from circuit 204. The various tristate conditions of amplifiers 232.1–4 driving the lines 54.1–3 in cable 52 are also controlled with signals on lines 234.1–3 from circuit 204.

Figure 11:
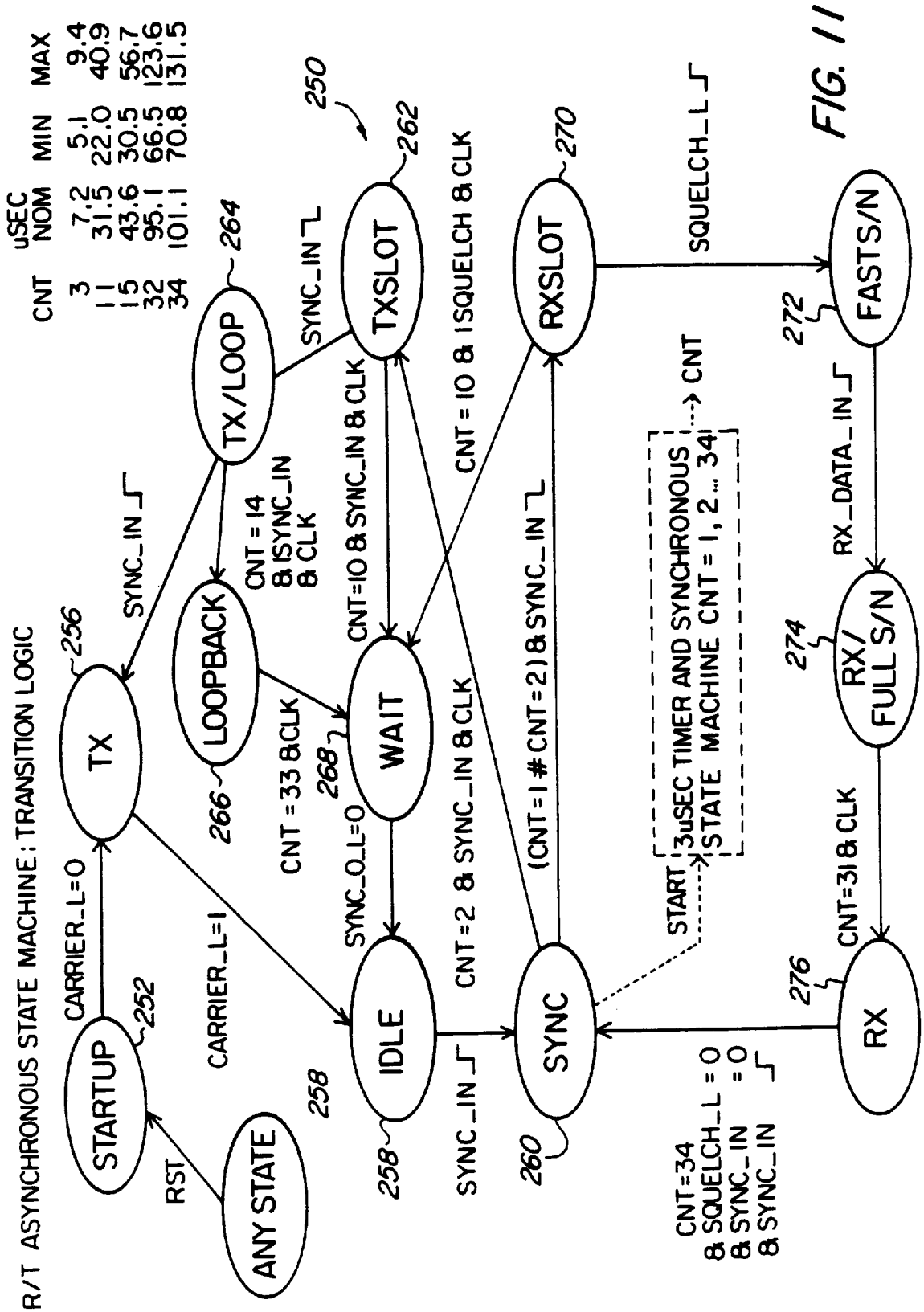
FIG. 11 is a state diagram of an RT module used in the IR communication system of FIG. 1.

The programming and operation of the P.A.L. circuit 204 can be best understood from the self-explanatory state diagram 250 in FIG. 11 in conjunction with the counts as illustrated on top of the figure. At 252 and commencing at start up step 252 the presence of a transmitter carrier on a transmission input line 54.1 from the base unit 40 is awaited at 256. When a carrier is detected an idle mode is entered at 258. If a sync pulse is detected at 260 either the occurrence of a calibration mode sync occurred or a receiver mode sync pulse has been detected. In the case of a calibration sync pulse a return sync pulse is generated at 266 and returned to the base unit 40 and the state is returned to step 258.

In the event a receiver slot sync pulse was detected then control is shifted to step 270. A fast abbreviated (three bit) A/D conversion is carried out as previously described at 272 followed by a full slower A/D conversion at 274 and sending of signals for a receive slot at 276 as received from a portable device 48.

Figure 12:
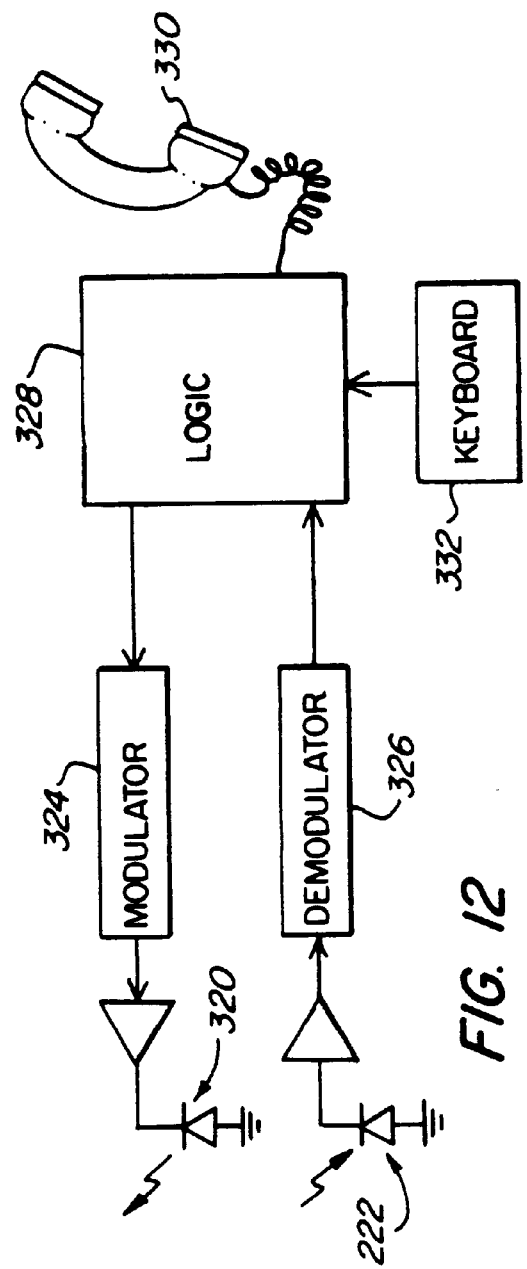
FIG. 12 is a block diagram view of an infrared portable unit used with the infrared communication system of this invention.

The portable unit 48 shown in FIG. 12 also includes an IR transmitter 320 and an IR detector 322 respectively connected to a modulator 324 and demodulator 326. A logic circuit 328 is used to handle the digital traffic and convert the signals to appropriate format for use by the conventional handset 330. A key board 332 such as used with conventional handsets is available to initiate calls. The logic network 328 provides the functions and operations like those in an RF portable unit and need, therefore, not be further described.

Figure 14:
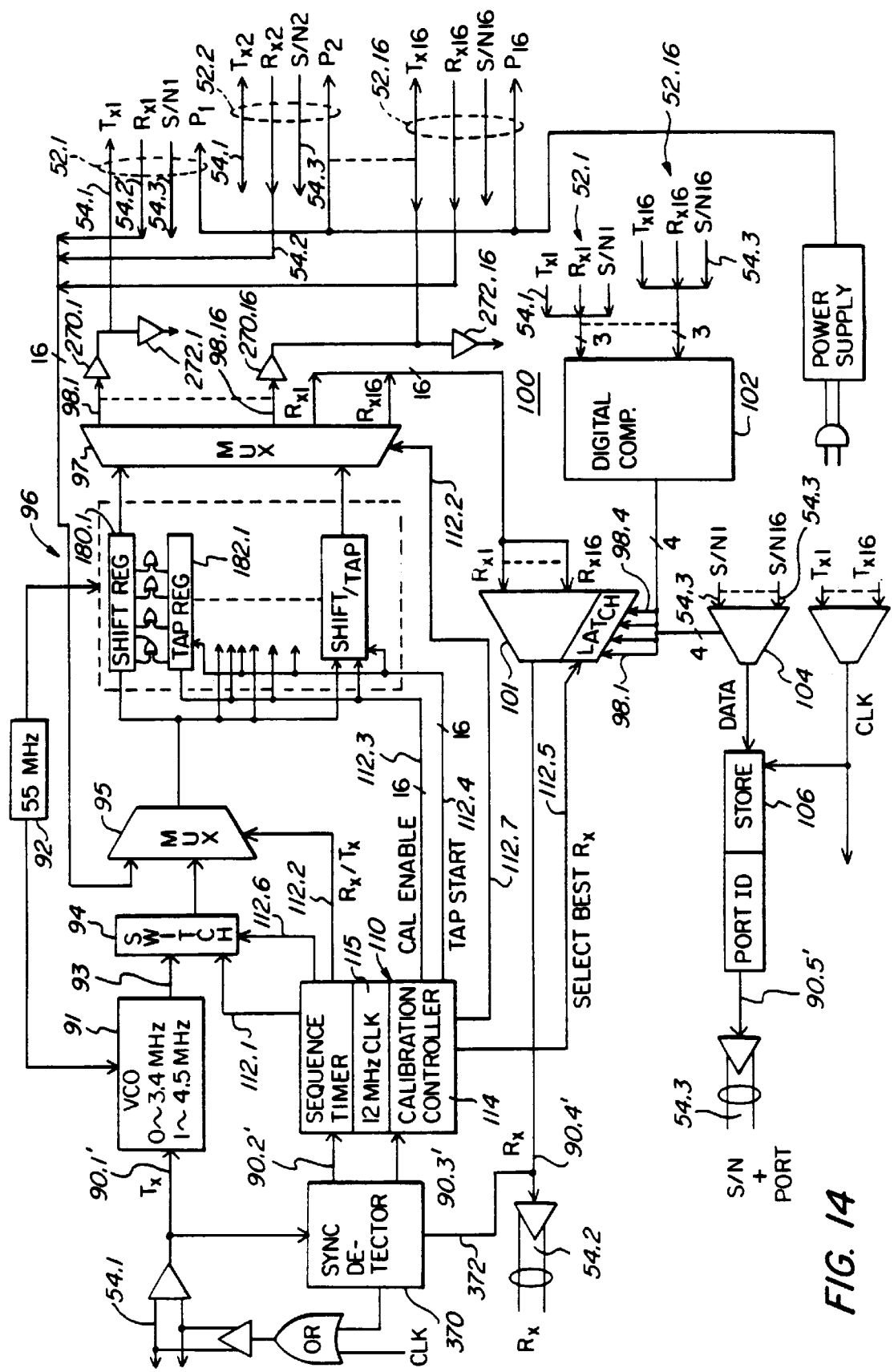
FIG. 14 is a block diagram view of a hub used in an infrared communication system in accordance with the invention.

FIG. 14 shows a hub 44, which is very similar to a base unit 40. For that reason circuits and lines having similar functions have the same numbers as described with reference to the base unit 40. A variation from the base unit occurs at the input of a hub where the incoming connections are made with a cable 52 having the $T_x$, 54.1, $R_x$, 54.2, and S/N, 54.3 lines as previously described. The resulting inputs correspond to the lines described with reference to FIG. 5 and have been correspondingly numbered 90.1', 90.4' and 90.5'.

The slot sync 90.2' and frame sync 90.3' are derived from the input line 90.1' with a sync detector 370. This detector recognizes when a calibration sync pulse is being sent and responds with a return signal on line 372.

Figure 13:
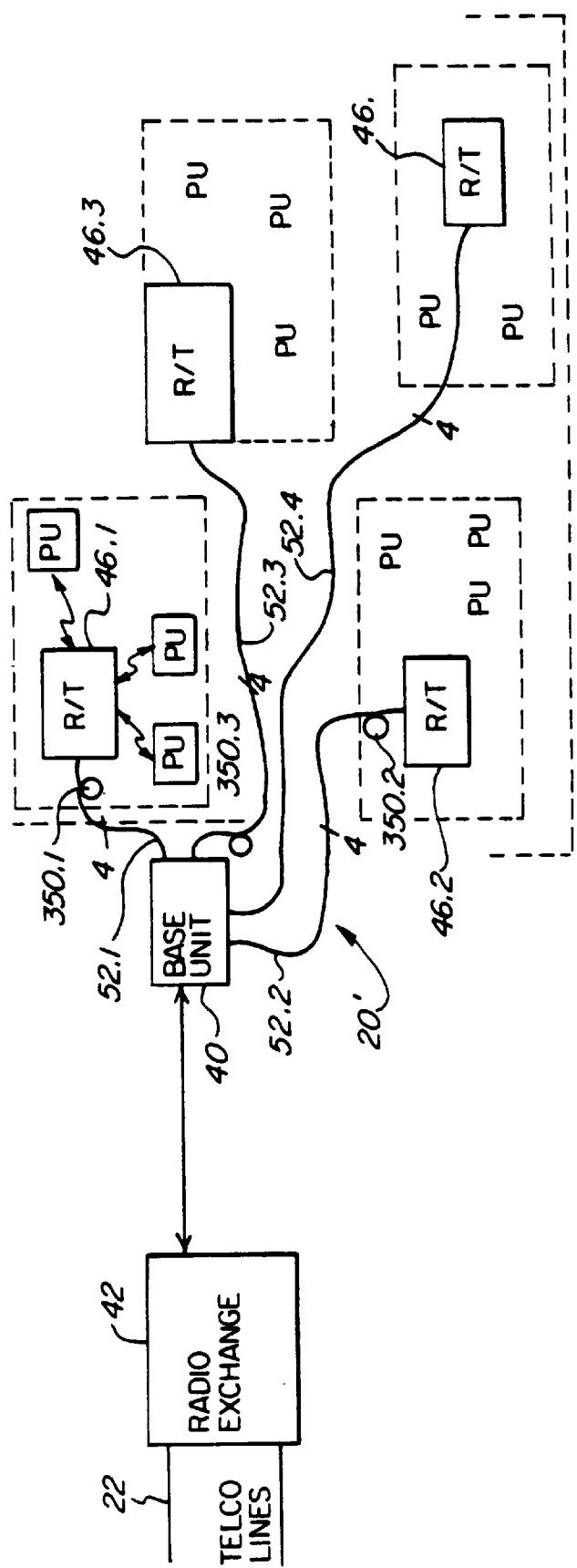
FIG. 13 is a system block diagram view of an alternate embodiment for an infrared communication system in accordance with the invention.

FIG. 13 shows an alternative IR system 20' in accordance with the invention. Instead of an automatic delay generating system, the cables 52 connecting a base unit 40 to nearby RT modules 46 are made all essentially the same in length. This requires that the shorter cables 52 include extra lengths that are wound into coils 350. The cable lengths need not be the same for those RT modules 46 not sufficiently close or separated by a wall and thus not likely to communicate with the same portable device 48 at the same time.

Figure 15:
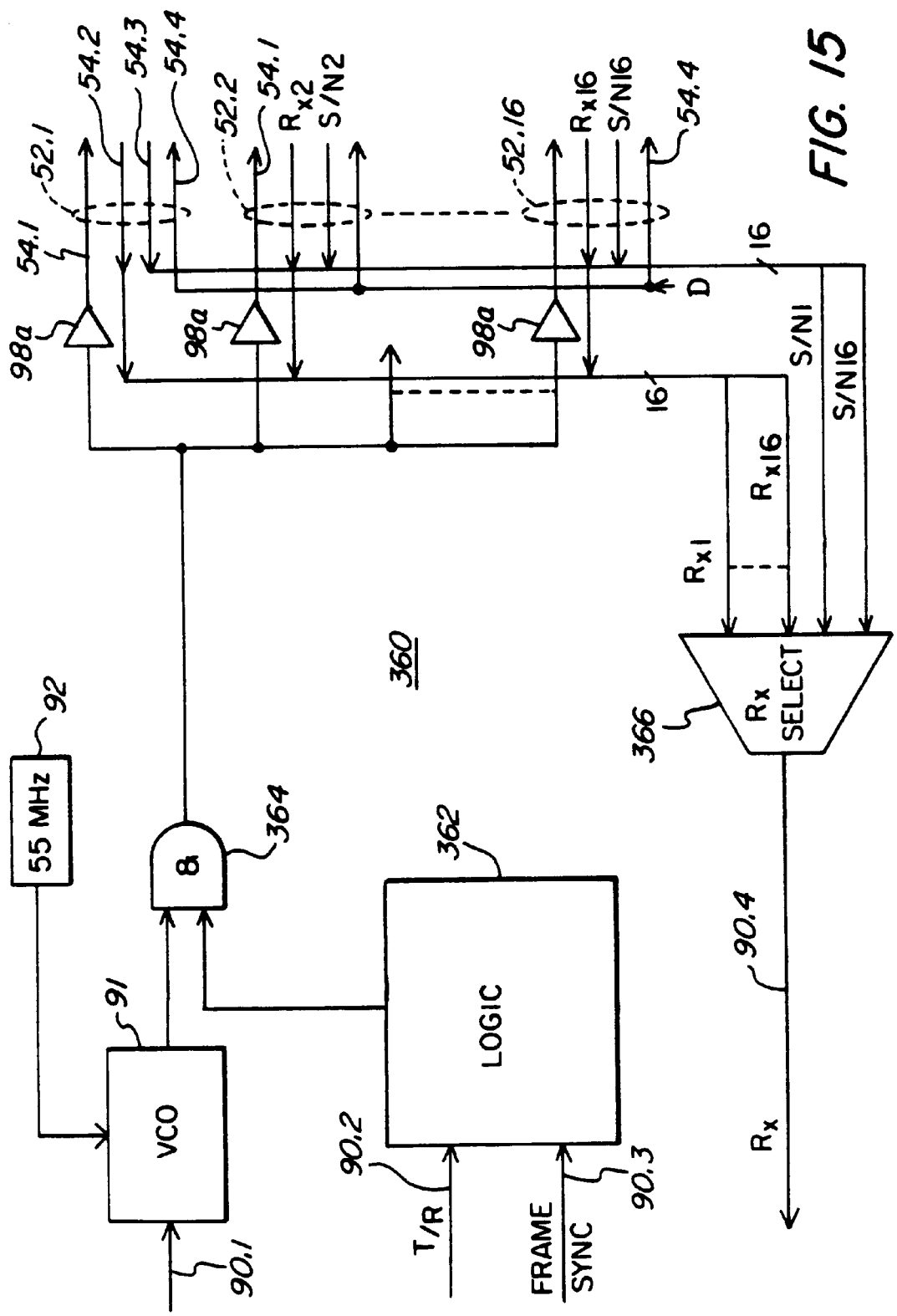
FIG. 15 is a block diagram, view of a simplified base unit for use with a communication system as shown in FIG. 13.

The system 20' may use a simplified base unit 360 as shown in FIG. 15 wherein like numbers designate similar circuits or networks as previously described. Base unit 360 employs a logic network 362 which responds to the incoming frame sync signal on line 90.3 to enable an AND gate 364 during the transmission segment 28 of the operation. The transmission from the base unit 20' is passed directly on to the cables 52 through appropriate drivers 98a.

Figure 16:
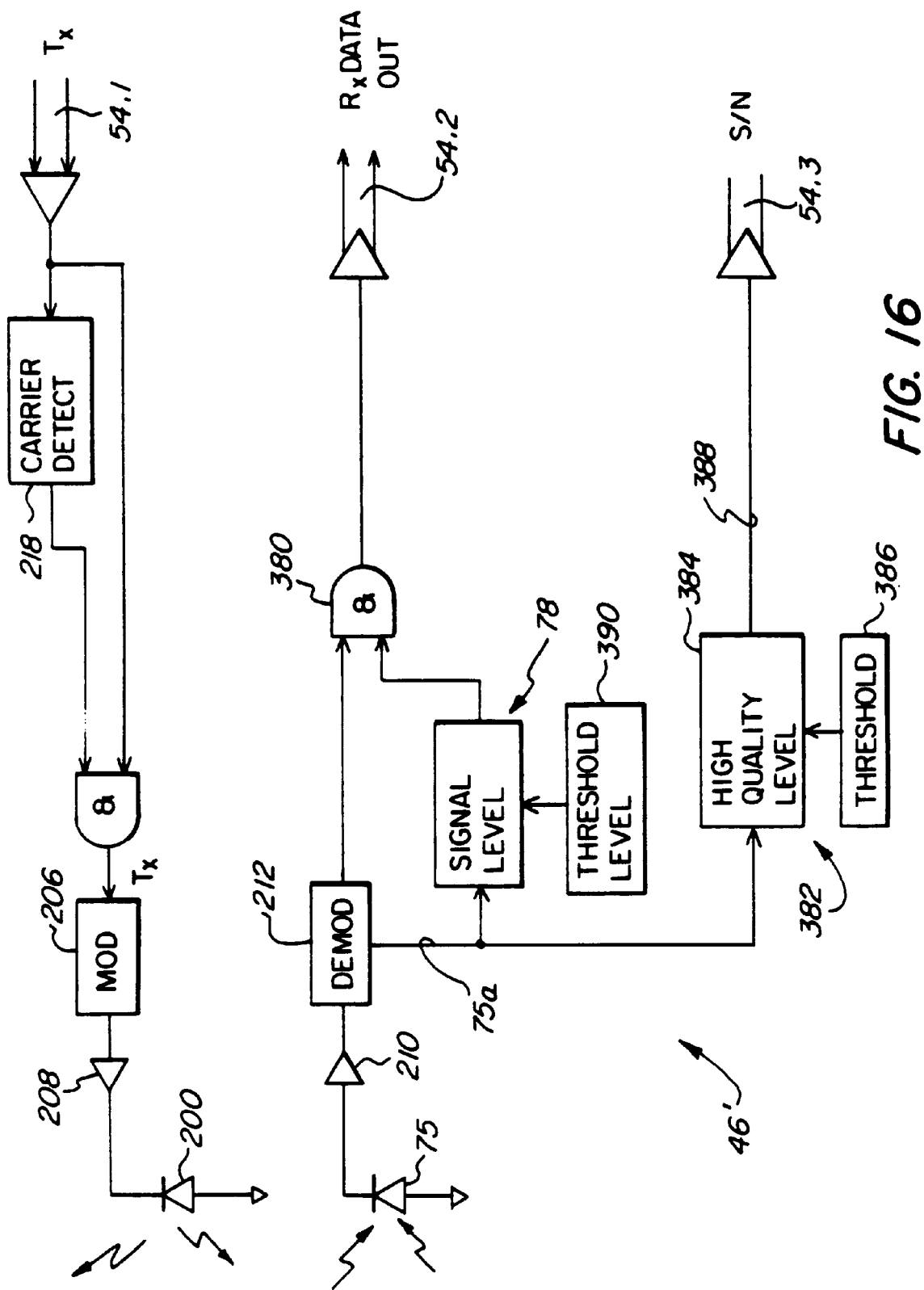
FIG. 16 is a block diagram view of a simplified RT module for use with the communication system as shown in FIGS. 13 and 14.

During the receive segment 32 the $R_x$ signals from the various RT modules 46', see FIG. 16, are passed through a best signal selection network 366. The circuits and networks described with reference to base unit 360 can be implemented by a microprocessor instead of with discrete circuitry as shown. The operation of these networks can be best explained with reference to the modified RT module 46' as shown in FIG. 16 and wherein like numerals designate like components as previously described.

In FIG. 16 the demodulated IR signal from a portable device is applied as an $R_x$ signal to an AND gate 380. A signal representative of the received signal strength is applied on line 75a to squelch type networks 78 and 382. If the IR signal level is very high, thus representing a high quality signal, a comparator 384 detects that the signal exceeds an adjustable threshold value as set at 386. The output is a high quality signal on line 388 which is applied to the signal to noise ratio line 54.3 from this RT module 46' to the base unit 360.

As long as the signal level on line 75a is sufficient for passing on to the base unit 360, because the signal exceeds an adequate threshold level as set at 390, the AND gate 380 is enabled and the digital $R_x$ signal is passed on to the $R_x$ data output line 54.2 to the base unit 360.

Figure 17:
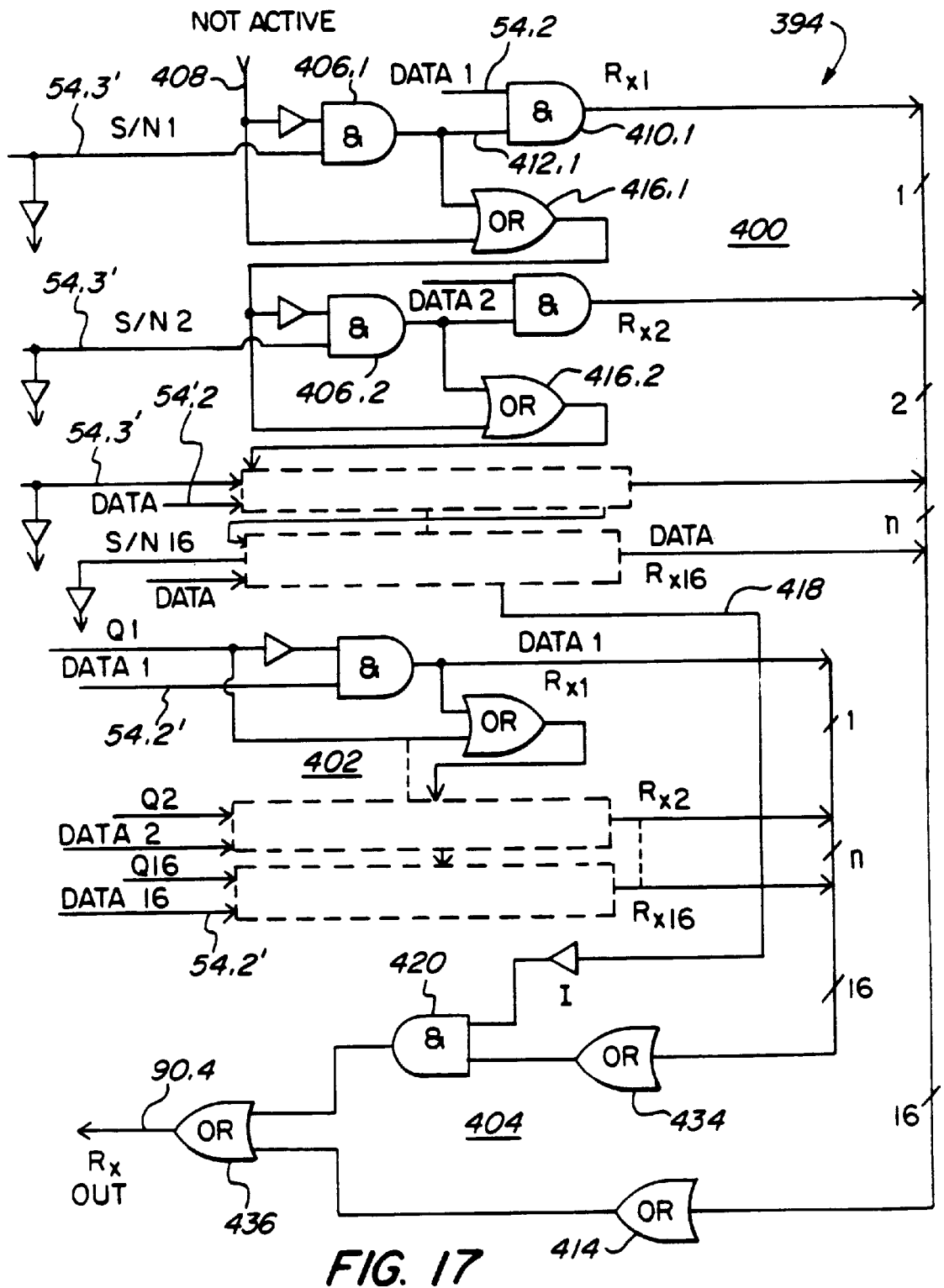
FIG. 17 is a schematic block diagram view of a network at the base unit shown in FIG. 15 and is used to determine the best IR signal received at RT modules from portable devices.

Returning to the base unit 360 shown in FIG. 15 and with reference also to FIG. 17 the best signal selection process can be explained keeping the signals from the RT modules 46' in mind. The signal lines 54 identified in FIG. 17 represent the same signals as on lines 54 except that they lines are single conductors from the outputs of receivers, not shown, connected to lines 54 from the RT modules 46'. A priority network 394 is used to first assure that the $R_x$ signal having a high quality level associated with it is detected with network 400 and thus first passed on to the radio exchange 24 via line 90.4. A second priority network 402 is used to pass an $R_x$ signal onto line 90.2 as long as one of the signals from the RT modules 46' exceeds the adequate signal threshold level set by networks 390 (FIG. 16).

A final decision network 404 is used to combine the outputs from the networks 400 and 402 to present on line 90.4 the $R_x$ signal for the radio exchange 24. The best signal selection works by coupling the high quality signals on lines 54.3', the S/N signals, from sixteen RT modules 46' to AND gates 406.1–16. The RT module 46', which could be the one connected to port 1 of the base unit 360, has its S/N line 54.3' coupled to the input of AND gate 406.1 together with a reference signal on line 408 representing an inactive signal level. If there is a high quality signal level present on line 54.3' leading to AND gate 406.1 then its output 412.1 is enabled and in turn enables the AND gate 410.1. This allows data from the RT module 46' on line 54.2' to be passed on to the OR gate 414 in network 404.

The occurrence of an active signal level on line 412.1 is coupled through an OR gate 416.1 and an inverter 418.1 to disable AND gate 406.2. All subsequent portions of circuit 400 are disabled in this manner so that only one high quality data signal is passed on to network 404. In a similar manner if the only high quality signal occurs on any other line 54.3' it is passed on to network 404. The occurrence of a high quality signal level on any line 54.3' results in the disablement of the outputs from the selection network 402 with a signal on line 418 from the last OR gate 416.16 in the chain. This disabling signal is applied to an AND gate 420 in network 404.

In the event there is no high quality signal level, then a data signal having the next acceptable signal level is passed on to network 404 by the selection network 402. This process involves the generation of an adequate level signal Q on lines 420.1–6. These Q signals are derived from the combination of a lack of signals on lines 54.3' and the presence of data ($R_x$) signals on any one of the lines 54.2'. The selection of the best $R_x$ signal by circuit 402 employs a similar technique as described for circuit 400.

The first Q signal on line 430 is applied through an inverter to an AND gate 432.1 together with the data signals on line 54.2'. If there is an adequate signal level then this is passed onto network 404 via OR gate 434 and thus through AND gate 420 to the output line 90.4 through OR gate 436. If the adequate signal level occurs from any other RT module 46', the next highest data signal in the chain of priority is passed on.

Having thus described several embodiments in accordance with the invention its advantages can be understood. Variations from the drawings can be made without departing from the scope of the invention as defined by the following claims.

What is claimed is:

1. An infrared receiver/transmitter (RT) module for use in a communication system using a time division multiple access communication protocol for enabling a central control unit connected to telephone lines to communicate with a plurality of portable infrared devices located within a building through a signal processing unit which produces a repetitive frame signal having time spaced transmission and receiving segments each of which includes a plurality of time spaced respective transmission and receiving slots, comprising:

an infrared, receiver and transmitter (RT) module, said RT module including means for sending signals received from a base unit within transmission slots at an infrared carrier frequency to portable infrared devices and means for sending signals received in the form of infrared signals from portable devices within receiving slots to the base unit;

said RT module including a signal generator to produce characteristic signals indicative of a quality of infrared signals occurring during respective receiving slots and incident at the RT module from infrared portable devices communicating during said respective receiving slots with the base unit.

2. An infrared receiver/transmitter (RT) module for use in a communication system using a time division multiple access communication protocol for enabling a central control unit connected to telephone lines to communicate with a plurality of portable infrared devices located within a building through a signal processing unit which produces a repetitive frame signal having time spaced transmission and receiving segments each of which includes a plurality of time spaced respective transmission and receiving slots, comprising:

an infrared, receiver and transmitter (RT) module, said RT module including means for sending signals received from a base unit within transmission slots at an infrared carrier frequency to portable infrared devices and means for sending signals received in the form of infrared signals from portable devices within receiving slots to the base unit;

said RT module including a signal strength detector to produce characteristic signals indicative of the strength of infrared signals occurring during respective receiving slots and incident at the RT module from infrared portable devices communicating during said respective receiving slots with the base unit;

means for producing a reference signal indicative of a high quality infrared signal level incident on the RT module; and means responsive to the reference signal and a signal representative of the infrared signal incident on the RT module for producing said characteristic signals when said infrared signals incident on the RT module exceed the reference signal level.

3. An infrared receiver/transmitter (RT) module for use in a communication system using a time division multiple access communication protocol for enabling a central control unit connected to telephone lines to communicate with a plurality of portable infrared devices located within a building through a signal processing unit which produces a repetitive frame signal having time spaced transmission and receiving segments each of which includes a plurality of time spaced respective transmission and receiving slots, comprising:

an infrared, receiver and transmitter (RT) module, said RT module including first means for sending signals received from a base unit within transmission slots at an infrared carrier frequency to portable infrared devices and second means for sending signals received in the form of infrared signals from portable devices within receiving slots to the base unit;

said RT module including a signal generator, which produces characteristic signals indicative of a quality of infrared signals occurring during respective receiving slots and incident at the RT module from infrared portable devices communicating during said respective receiving slots with the base unit;

means for producing a reference signal indicative of an acceptable quality infrared signal level incident on the RT module;

means responsive to the reference signal and a signal representative of the infrared signal incident on the RT module for producing an enabling signal when said infrared signals incident on the RT module exceed the reference signal level; and means responsive to the enabling signal and an electrical form of the infrared signals incident upon the RT module for activating the second sending means.

4. The RT module as claimed in claim 1 wherein said signal generator further comprises:

means for producing a control signal representative of the end of a preceding slot; and means activated by the control signal for generating a said characteristic signal indicative of a quality of the infrared signal incident on the RT module during a receiving slot which follows the preceding slot.

5. The RT module as claimed in claim 4 wherein said receiving signals sent in different slots during receiving segments are separated by short intervals of time; and wherein said characteristic signal generating means comprises a fast analog to digital converter coupled to produce a predetermined number of data bits representative of the signal strength or signal-to-noise ratio of the infrared signals incident on the RT module during the short intervals.

6. The RT module as claimed in claim 5 and further including means for sending the individual data bits from the fast analog to digital converter on separate lines to said base unit.

7. An infrared receiver/transmitter (RT) module for use in a communication system using a time division multiple access communication protocol for enabling a central control unit connected to telephone lines to communicate with a plurality of portable infrared devices located within a building through a signal processing unit which produces a repetitive frame signal having time spaced transmission and receiving segments each of which includes a plurality of time spaced respective transmission and receiving slots, comprising:

an infrared, receiver and transmitter (RT) module, said RT module including means for sending signals received from a base unit within transmission slots at an infrared carrier frequency to portable infrared devices and means for sending signals received in the form of infrared signals from portable devices within receiving slots to the base unit;

said RT module including a signal strength detector to produce characteristic signals indicative of the strength of infrared signals occurring during respective receiving slots and incident at the RT module from infrared portable devices communicating during said respective receiving slots with the base unit; and means for sensing a calibration mode and means responsive to the sensed calibration mode for returning signals to a base unit for a measurement of the length of a cable coupling the RT module to the base unit.

8. An infrared digital and analog communication system using a time division multiple access communication protocol for enabling a central control unit connected to telephone lines to communicate with a plurality of portable infrared devices located within a building through a signal processing unit which produces a repetitive frame signal having time spaced transmission and receiving segments each of which includes a plurality of time spaced respective transmission and receiving slots, a respective pair of which is, when needed to establish communication, designated to transmit and receive signals between a portable infrared device and a base unit, comprising:

a base unit operatively located between the signal processing unit and the portable devices for enabling communication therebetween;

a plurality of spaced apart stationary infrared receiver and transmitter (RT) modules, interposed between the base unit and said portable devices, for transmitting and receiving infrared signals at a desired carrier frequency to and from said portable devices;

said RT modules each including a signal processor, which produces a characteristic signal representative that the intensity or the signal-to-noise ratio of IR carrier signals from portable devices incident on the respective RT module for each receiving slot exceeds a minimum threshold level;

a receiving signal selector in the base unit, responsive to said characteristic signals from RT modules, to select a received signal from one of several RT modules which respond to an infrared portable device transmission for transfer of the selected received signal to said signal processing unit, whereby the system's IR connection to a portable infrared device can be effectively, automatically and instantly handed off from an RT module experiencing an unacceptable infrared input signal to an RT module having an acceptable infrared input signal.

9. The infrared communication system as claimed in claim 8 wherein said RT module's signal processor produces a high quality signal indicative that the IR carrier signals from a portable device incident on the respective RT module for a respective receiving slot exceeds a predetermined high quality signal level.

10. The infrared communication system as claimed in claim 9 wherein said receiving signal selector in said base unit further includes a priority network responsive to respective high quality signals from different RT modules so as to select one of said high quality signals.

11. The infrared communication system as claimed in claim 8 and further including:

a hub interposed between the base unit and a plurality of RT modules; said hub having a first port for connection to the base unit and a plurality of second ports for connection to a plurality of RT modules, said hub having an interconnection network between said first port and said second ports to enable communication between said portable devices and said base unit within said transmission and receiving slots as if the hub were an RT module.

\* \* \* \* \*